United States Patent
Zhang et al.

(10) Patent No.: US 12,196,877 B2
(45) Date of Patent: Jan. 14, 2025

(54) COOPERATIVE VEHICULAR RADAR SENSING

(71) Applicant: QUALCOMM Incorporated, San Diego, CA (US)

(72) Inventors: Dan Zhang, San Diego, CA (US); Kapil Gulati, Belle Mead, NJ (US); Junyi Li, Franklin Park, NJ (US)

( * ) Notice: Subject to any disclaimer, the term of this patent is extended or adjusted under 35 U.S.C. 154(b) by 590 days.

(21) Appl. No.: 17/246,308

(22) Filed: Apr. 30, 2021

(65) Prior Publication Data
US 2022/0365167 A1 Nov. 17, 2022

(51) Int. Cl.
| | |
|---|---|
| G01S 7/00 | (2006.01) |
| G01S 13/931 | (2020.01) |
| H04W 4/40 | (2018.01) |
| H04W 92/18 | (2009.01) |

(52) U.S. Cl.
CPC ............ *G01S 7/003* (2013.01); *G01S 13/931* (2013.01); *H04W 4/40* (2018.02); *H04W 92/18* (2013.01)

(58) Field of Classification Search
CPC ........... G01S 2103/9316; G01S 13/003; G01S 13/878; G01S 13/931; G01S 7/42; G01S 7/003; H04W 92/18
USPC ..................................................... 342/58, 59
See application file for complete search history.

(56) References Cited

U.S. PATENT DOCUMENTS

| | | | |
|---|---|---|---|
| 6,665,540 B2 * | 12/2003 | Rantalainen | G01S 5/10 342/450 |
| 8,208,952 B2 * | 6/2012 | Zorba Barah | H04B 7/0697 455/67.11 |
| 8,385,454 B2 * | 2/2013 | Tajer | H04B 7/0626 375/267 |
| 8,520,762 B2 * | 8/2013 | Tajer | H04B 7/022 370/344 |
| 8,520,763 B2 * | 8/2013 | Tajer | H04B 7/022 375/267 |
| 8,818,399 B2 * | 8/2014 | Siomina | H04B 17/309 455/456.2 |

(Continued)

FOREIGN PATENT DOCUMENTS

CN 110261856 A 9/2019

OTHER PUBLICATIONS

International Search Report and Written Opinion—PCT/US2022/026662—ISA/EPO—Aug. 11, 2022 (209034WO).

*Primary Examiner* — Vladimir Magloire
*Assistant Examiner* — Michael W Justice

(57) ABSTRACT

Methods, systems, and devices for wireless communications are described. A user equipment (UE) may receive an indication of a configuration to perform cooperative radar sensing. The configuration may indicate resources for the first UE to use to communicate radar measurement reports. The UE may receive, from another UE on the identified resources, a radar measurement report that includes values for one or more radar measurement parameters for a first radar target and a time stamp associated with the values. The UE may identify a second set of values for the radar measurement parameters (e.g., its own measurements, or measurements received from a third UE in another radar measurement reports). The UE may generate a combined set of values for the radar measurement parameters for each time stamp by combining the first set of values and the second set of values.

30 Claims, 13 Drawing Sheets

(56) References Cited

U.S. PATENT DOCUMENTS

| | | | | |
|---|---|---|---|---|
| 8,912,947 B1* | 12/2014 | Friesel | | G01S 7/003 342/175 |
| 9,869,766 B1* | 1/2018 | Breiholz | | G01S 13/106 |
| 10,775,481 B1* | 9/2020 | Puglielli | | G01S 7/288 |
| 10,903,945 B2* | 1/2021 | Prakash | | H04W 72/23 |
| 11,115,942 B2* | 9/2021 | Hampel | | H04W 28/0268 |
| 11,258,524 B2* | 2/2022 | Gulati | | H04L 5/0048 |
| 11,280,876 B2* | 3/2022 | Gulati | | G01S 7/006 |
| 11,408,973 B2* | 8/2022 | Stauffer | | H04W 16/14 |
| 11,432,369 B2* | 8/2022 | Xiong | | H04L 5/0091 |
| 11,474,235 B2* | 10/2022 | Niesen | | G01S 13/003 |
| 11,644,529 B2* | 5/2023 | Gulati | | G01S 13/343 342/173 |
| 11,940,526 B2* | 3/2024 | Chae | | G01S 13/46 |
| 2004/0128095 A1* | 7/2004 | Oestreich | | H04W 56/0045 702/89 |
| 2010/0182967 A1* | 7/2010 | Zorba Barah | | H04B 7/0452 370/329 |
| 2011/0059705 A1* | 3/2011 | Tajer | | H04B 7/0626 455/114.3 |
| 2011/0207477 A1* | 8/2011 | Siomina | | G01S 5/0244 455/67.11 |
| 2012/0170676 A1* | 7/2012 | Tajer | | H04B 7/0626 375/267 |
| 2013/0034176 A1* | 2/2013 | Tajer | | H04B 7/0626 375/260 |
| 2017/0111122 A1* | 4/2017 | Shimizu | | H04W 4/80 |
| 2019/0239172 A1* | 8/2019 | Hampel | | H04W 56/0065 |
| 2019/0253203 A1* | 8/2019 | Prakash | | H04L 1/0004 |
| 2019/0293748 A1* | 9/2019 | Gulati | | G01S 13/343 |
| 2019/0306923 A1* | 10/2019 | Xiong | | H04J 13/0062 |
| 2019/0369233 A1* | 12/2019 | Niesen | | H04W 4/46 |
| 2019/0383925 A1* | 12/2019 | Gulati | | G01S 13/341 |
| 2020/0007247 A1* | 1/2020 | Gulati | | H04B 17/373 |
| 2020/0107249 A1* | 4/2020 | Stauffer | | H04W 48/14 |
| 2020/0128436 A1* | 4/2020 | Chae | | H04B 7/0404 |
| 2020/0267026 A1* | 8/2020 | Manolakos | | H04W 72/23 |
| 2021/0045074 A1* | 2/2021 | Manolakos | | H04L 5/0057 |
| 2021/0088624 A1* | 3/2021 | Puglielli | | G01S 13/42 |
| 2021/0311181 A1* | 10/2021 | Chae | | G01S 13/931 |
| 2022/0038931 A1* | 2/2022 | Kuru | | H04L 1/0026 |
| 2022/0104178 A1* | 3/2022 | Lee | | H04W 76/14 |
| 2022/0216957 A1* | 7/2022 | Zhu | | H04W 74/0808 |
| 2022/0221876 A1* | 7/2022 | Staehlin | | G08G 1/161 |
| 2022/0225121 A1* | 7/2022 | Wanuga | | H04L 5/0048 |
| 2022/0256519 A1* | 8/2022 | Jeon | | G01S 7/0233 |
| 2022/0330198 A1* | 10/2022 | Ren | | H04W 64/006 |
| 2023/0076874 A1* | 3/2023 | Jeon | | H04B 7/0695 |
| 2023/0086144 A1* | 3/2023 | Roy | | H04L 5/005 |
| 2023/0266434 A1* | 8/2023 | Kalantari | | H04W 72/541 342/159 |

* cited by examiner

COOPERATIVE VEHICULAR RADAR SENSING

FIELD OF TECHNOLOGY

The following relates to wireless communications, including cooperative vehicular radar sensing.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). In some examples, UEs may perform radar sensing.

SUMMARY

The described techniques relate to improved methods, systems, devices, and apparatuses that support cooperative vehicular radar sensing. Generally, a user equipment (UE) may use radar sensing to identify one or more radar measurement parameter values related to a radar target at a particular timestamp. The radar measurement parameters may include object position, object orientation, object velocity, and respective uncertainty values for each radar measurement parameter value, etc. Each UE may broadcast (e.g., periodically, on-demand, or otherwise negotiated with other UEs) a radar measurement report including its own parameter values (e.g., a set of parameter values at a current timestamp for the transmitting UE), the measured parameter values for each identified radar target, and a timestamp for each set of parameter values of each radar target. A receiving UE may receive radar measurement reports from one or more other UEs, and may combine its own set of parameter values with its own measured sets of parameter values with the received sets of parameter values. For instance, for a particular time stamp and a particular radar target, the UE may fuse multiple sets of values (e.g. multiple tuples), resulting in a smaller uncertainty level for each parameter value for that radar target. Thus, the UE may identify unseen radar targets, and increase a certainty or confidence level with reference to position, velocity, orientation, or the like, for a particular radar target. This may increase the likelihood of successfully identifying other UEs (e.g., vehicles), blockages, pedestrians, or the like, resulting in decreased accidents, improved travel efficiency, and increased safety.

A method for wireless communications at a first UE is described. The method may include receiving an indication of a configuration to perform cooperative radar sensing, the configuration indicating resources for the first UE to use to communicate radar measurement reports, receiving, from a second UE according to the indicated configuration, a radar measurement report including a first set of values for one or more radar measurement parameters associated with a first radar target and an indication of a first time value associated with the first set of values, identifying, by the first UE, a second set of values for the one or more radar measurement parameters associated with the first radar target and the first time value, and generating a combined set of values for the one or more radar measurement parameters associated with the first time value by combining the first set of values and the second set of values.

An apparatus for wireless communications at a first UE is described. The apparatus may include a processor, memory in electronic communication with the processor, and instructions stored in the memory. The instructions may be executable by the processor to cause the apparatus to receive an indication of a configuration to perform cooperative radar sensing, the configuration indicating resources for the first UE to use to communicate radar measurement reports, receive, from a second UE according to the indicated configuration, a radar measurement report including a first set of values for one or more radar measurement parameters associated with a first radar target and an indication of a first time value associated with the first set of values, identify, by the first UE, a second set of values for the one or more radar measurement parameters associated with the first radar target and the first time value, and generate a combined set of values for the one or more radar measurement parameters associated with the first time value by combining the first set of values and the second set of values.

Another apparatus for wireless communications at a first UE is described. The apparatus may include means for receiving an indication of a configuration to perform cooperative radar sensing, the configuration indicating resources for the first UE to use to communicate radar measurement reports, means for receiving, from a second UE according to the indicated configuration, a radar measurement report including a first set of values for one or more radar measurement parameters associated with a first radar target and an indication of a first time value associated with the first set of values, means for identifying, by the first UE, a second set of values for the one or more radar measurement parameters associated with the first radar target and the first time value, and means for generating a combined set of values for the one or more radar measurement parameters associated with the first time value by combining the first set of values and the second set of values.

A non-transitory computer-readable medium storing code for wireless communications at a first UE is described. The code may include instructions executable by a processor to receive an indication of a configuration to perform cooperative radar sensing, the configuration indicating resources for the first UE to use to communicate radar measurement reports, receive, from a second UE according to the indicated configuration, a radar measurement report including a first set of values for one or more radar measurement parameters associated with a first radar target and an indication of a first time value associated with the first set of values, identify, by the first UE, a second set of values for the one or more radar measurement parameters associated with the first radar target and the first time value, and generate a combined set of values for the one or more radar measurement parameters associated with the first time value by combining the first set of values and the second set of values.

In some examples of the method, apparatuses, and non-transitory computer-readable medium described herein, identifying the second set of values for the one or more radar measurement parameters may include operations, features, means, or instructions for transmitting a radar waveform according to the indicated configuration, receiving a reflection of the radar waveform off of the first radar target, and determining, based on the received reflection, the second set of values for the one or more radar measurement parameters associated with the first radar target and the first time value.

In some examples of the method, apparatuses, and non-transitory computer-readable medium described herein, identifying the second set of values for the one or more radar measurement parameters may include operations, features, means, or instructions for receiving, from a third UE according to the indicated configuration, a second radar measurement report including the second set of values for the one or more radar measurement parameters and an indication of the first time value associated with the second set of values.

In some examples of the method, apparatuses, and non-transitory computer-readable medium described herein, receiving the indication of the configuration to perform cooperative radar sensing may include operations, features, means, or instructions for receiving, from a base station, an allocation of the resources for the first UE to use to communicate radar measurement reports, where the resources include periodic sidelink resources, aperiodic sidelink resources, or both, for receiving the radar measurement report.

Some examples of the method, apparatuses, and non-transitory computer-readable medium described herein may further include operations, features, means, or instructions for determining that a sidelink channel may be available for sidelink communications, the sidelink channel including the resources for the first UE to use to communicate radar measurement reports.

Some examples of the method, apparatuses, and non-transitory computer-readable medium described herein may further include operations, features, means, or instructions for receiving, in the radar measurement report, a third set of values for the one or more radar measurement parameters associated with a second radar target and an indication of the first time value associated with the third set of values and storing an indication of the first radar target and the second radar target, based on receiving the third set of values.

In some examples of the method, apparatuses, and non-transitory computer-readable medium described herein, receiving the radar measurement report may include operations, features, means, or instructions for receiving a broadcast sidelink message including the radar measurement report from the second UE.

In some examples of the method, apparatuses, and non-transitory computer-readable medium described herein, receiving the radar measurement report may include operations, features, means, or instructions for receiving a unicast sidelink message including the radar measurement report from the second UE.

In some examples of the method, apparatuses, and non-transitory computer-readable medium described herein, the one or more radar measurement parameters include a velocity measurement, a velocity uncertainty level, a position measurement, a position uncertainty level, an orientation measurement, an orientation uncertainty level, a radar cross-section measurement, a radar cross-section uncertainty level, a signal strength measurement, a signal strength uncertainty level, or any combination thereof.

In some examples of the method, apparatuses, and non-transitory computer-readable medium described herein, the radar measurement report includes an identifier of the second UE.

Some examples of the method, apparatuses, and non-transitory computer-readable medium described herein may further include operations, features, means, or instructions for identifying a reference frame that may be common to the first UE and the second UE for the one or more radar measurement parameters, where the first set of values for the one or more radar measurement parameters and the second set of values for the one or more radar measurement parameters may be based on the reference frame.

Some examples of the method, apparatuses, and non-transitory computer-readable medium described herein may further include operations, features, means, or instructions for identifying a first reference frame associated with the second UE, the radar measurement report including an indication of the first reference frame, identifying the first set of values based on the indication of the first reference frame, and identifying a second reference frame associated with the second set of values for the one or more radar measurement parameters, where identifying the second set of values may be based on the second reference frame.

Some examples of the method, apparatuses, and non-transitory computer-readable medium described herein may further include operations, features, means, or instructions for determining that a distance between the first UE and the second UE satisfies a threshold distance value, where determining the configuration to perform cooperative radar sensing may be based on determining that the distance satisfies the threshold distance value.

A method for wireless communications at a second UE is described. The method may include receiving an indication of a configuration to perform cooperative radar sensing, the configuration indicating resources for the second UE to use to communicate radar measurement reports, transmitting a radar waveform according to the indicated configuration, receiving a reflection of the radar waveform off of at least a first radar target, determining, based on the received reflection, a first set of values for one or more radar measurement parameters associated with the first radar target, and transmitting, to at least a first UE according to the indicated configuration, a radar measurement report including the first set of values and an indication of a first time value associated with the first set of values.

An apparatus for wireless communications at a second UE is described. The apparatus may include a processor, memory in electronic communication with the processor, and instructions stored in the memory. The instructions may be executable by the processor to cause the apparatus to receive an indication of a configuration to perform cooperative radar sensing, the configuration indicating resources for the second UE to use to communicate radar measurement reports, transmit a radar waveform according to the indicated configuration, receive a reflection of the radar waveform off of at least a first radar target, determine, based on the received reflection, a first set of values for one or more radar measurement parameters associated with the first radar target, and transmit, to at least a first UE according to the indicated configuration, a radar measurement report including the first set of values and an indication of a first time value associated with the first set of values.

Another apparatus for wireless communications at a second UE is described. The apparatus may include means for receiving an indication of a configuration to perform cooperative radar sensing, the configuration indicating resources for the second UE to use to communicate radar measurement reports, means for transmitting a radar waveform according to the indicated configuration, means for receiving a reflection of the radar waveform off of at least a first radar target, means for determining, based on the received reflection, a first set of values for one or more radar measurement parameters associated with the first radar target, and means for transmitting, to at least a first UE according to the indicated configuration, a radar measurement report including the first set of values and an indication of a first time value associated with the first set of values.

A non-transitory computer-readable medium storing code for wireless communications at a second UE is described. The code may include instructions executable by a processor to receive an indication of a configuration to perform cooperative radar sensing, the configuration indicating resources for the second UE to use to communicate radar measurement reports, transmit a radar waveform according to the indicated configuration, receive a reflection of the radar waveform off of at least a first radar target, determine, based on the received reflection, a first set of values for one or more radar measurement parameters associated with the first radar target, and transmit, to at least a first UE according to the indicated configuration, a radar measurement report including the first set of values and an indication of a first time value associated with the first set of values.

Some examples of the method, apparatuses, and non-transitory computer-readable medium described herein may further include operations, features, means, or instructions for receiving, from the first UE according to the indicated configuration, a second radar measurement report including a second set of values for the one or more radar measurement parameters associated with the first radar target and an indication of the first time value associated with the second set of values and generating a combined set of values for the one or more radar measurement parameters associated with the first time value by combining the first set of values and the second set of values.

In some examples of the method, apparatuses, and non-transitory computer-readable medium described herein, receiving the indication of the configuration to perform cooperative radar sensing may include operations, features, means, or instructions for receiving, from a base station, an allocation of the resources for the second UE to use to communicate radar measurement reports, where the resources include periodic sidelink resources, aperiodic sidelink resources, or both, for transmitting the radar measurement report.

Some examples of the method, apparatuses, and non-transitory computer-readable medium described herein may further include operations, features, means, or instructions for determining that a sidelink channel may be available for sidelink communications, the sidelink channel including the resources for the second UE to receive the radar measurement reports.

In some examples of the method, apparatuses, and non-transitory computer-readable medium described herein, transmitting the radar measurement report may include operations, features, means, or instructions for transmitting, to a set of multiple UEs including the first UE, a broadcast sidelink message including the radar measurement report.

In some examples of the method, apparatuses, and non-transitory computer-readable medium described herein, transmitting the radar measurement report may include operations, features, means, or instructions for transmitting, to the first UE, a unicast sidelink message including the radar measurement report.

In some examples of the method, apparatuses, and non-transitory computer-readable medium described herein, a velocity measurement, a velocity uncertainty level, a position measurement, a position uncertainty level, an orientation measurement, an orientation uncertainty level, a radar cross-section measurement, a radar cross-section uncertainty level, a signal strength measurement, a signal strength uncertainty level, or any combination thereof.

In some examples of the method, apparatuses, and non-transitory computer-readable medium described herein, the radar measurement report includes an identifier of the second UE.

Some examples of the method, apparatuses, and non-transitory computer-readable medium described herein may further include operations, features, means, or instructions for identifying a reference frame associated with the second UE, where the first set of values for the one or more radar measurement parameters may be based on the reference frame associated with the second UE and including the reference frame associated with the second UE in the radar measurement report.

Some examples of the method, apparatuses, and non-transitory computer-readable medium described herein may further include operations, features, means, or instructions for determining that a distance between the first UE and the second UE satisfies a threshold distance value, where determining the configuration to perform cooperative radar sensing may be based on determining that the distance satisfies the threshold distance value.

DETAILED DESCRIPTION

Figure 1:
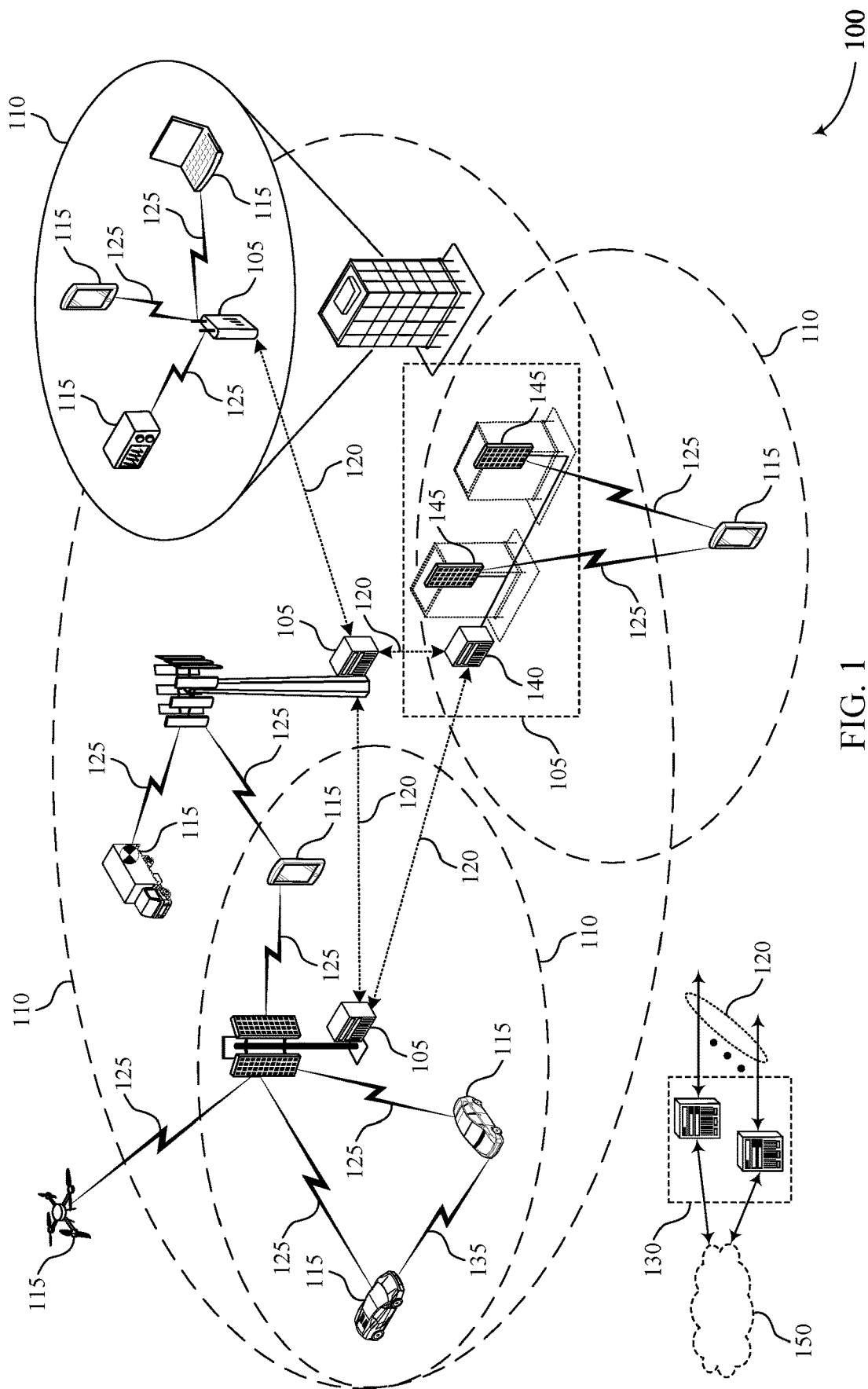
FIG. 1 illustrates an example of a wireless communications system that supports cooperative vehicular radar sensing in accordance with aspects of the present disclosure.

Wireless communications systems (e.g., vehicle-to-everything (V2X) systems) may support radar sensing procedures. A user equipment (UE) (e.g. a vehicle equipped with one or more radar transmitters) may transmit radar waveforms in one or more directions, and may identify surrounding radar targets (e.g., objects such as other UEs (e.g., other vehicles), pedestrians, obstructions, building, or the like). For example, a UE may determine a set of values for one or more radar measurement parameters (e.g., velocity, positioning, orientation, and respective uncertainty values for each value for the parameters, etc.) for each detected radar target. However, radar sensing may be subject to limitations resulting from physical blockages, blind spots, detection range, and interference from other radar signals. As a result of such limitations, a UE may falsely detect an object or fail to detect an object at all, resulting failed radar detection procedures, slower traffic, and increased risk of accidents.

In some examples, a UE may use radar sensing to identify one or more radar measurement parameter values related to a radar target at a particular timestamp. The radar measurement parameters may include object position, object orientation, object velocity, and respective uncertainty values for each radar measurement parameter value, etc. Each UE may broadcast (e.g., periodically, on-demand, or otherwise negotiated with other UEs) a radar measurement report including its own parameter values (e.g., a set of parameter values at a current timestamp for the transmitting UE), the measured parameter values for each identified radar target, and a timestamp for each set of parameter values associated with each radar target. A receiving UE may receive radar measurement reports from one or more other UEs, and may combine the UE's own set of parameter values with the UE's own measured sets of parameter values with the received sets of parameter values. For instance, for a particular time stamp and a particular radar target, the UE may fuse multiple sets of values (e.g. multiple tuples), resulting in a smaller uncertainty level for each parameter value for that radar target. Thus, the UE may increase a certainty or confidence level with reference to position, velocity, orientation, or the like, for a particular radar target. This may increase the likelihood of successfully identifying other UEs (e.g., vehicles), blockages, pedestrians, or the like, resulting in decreased accidents, improved travel efficiency, and increased safety.

Particular aspects of the subject matter described herein may be implemented to realize one or more advantages. The described techniques may support improvements in radar sensing and communication such that a device may identify radar targets that would otherwise be undetectable to the device (e.g., as a result of blockages, detectable range limitations, interference, or the like), or more accurately identify the location of falsely identified radar targets, or increase the confidence level of identified radar targets, or any combination thereof. It may also allow a device to avoid accidents, more accurately or efficiently navigate traffic, increase safety, or the like.

Aspects of the disclosure are initially described in the context of wireless communications systems. Aspects of the disclosure are further illustrated by and described with reference to radar waveforms and process flows. Aspects of the disclosure are further illustrated by and described with reference to apparatus diagrams, system diagrams, and flowcharts that relate to cooperative vehicular radar sensing.

FIG. 1 illustrates an example of a wireless communications system 100 that supports cooperative vehicular radar sensing in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a first UE 115 may receive an indication of a configuration to perform cooperative radar sensing. The configuration may indicate resources for the first UE 115 to use to communicate radar measurement reports. The UE 115 may receive, from another UE 115 on the identified resources, a radar measurement report that includes values for one or more radar measurement parameters for a first radar target and a time stamp associated with the values. The UE 115 may identify a second set of values for the radar measurement parameters (e.g., the own measurements of UE 115, or measurements received from a third UE 115 in another radar measurement reports). The UE 115 may generate a combined set of values for the radar measurement parameters for each time stamp by combining the first set of values and the second set of values.

Figure 2A:
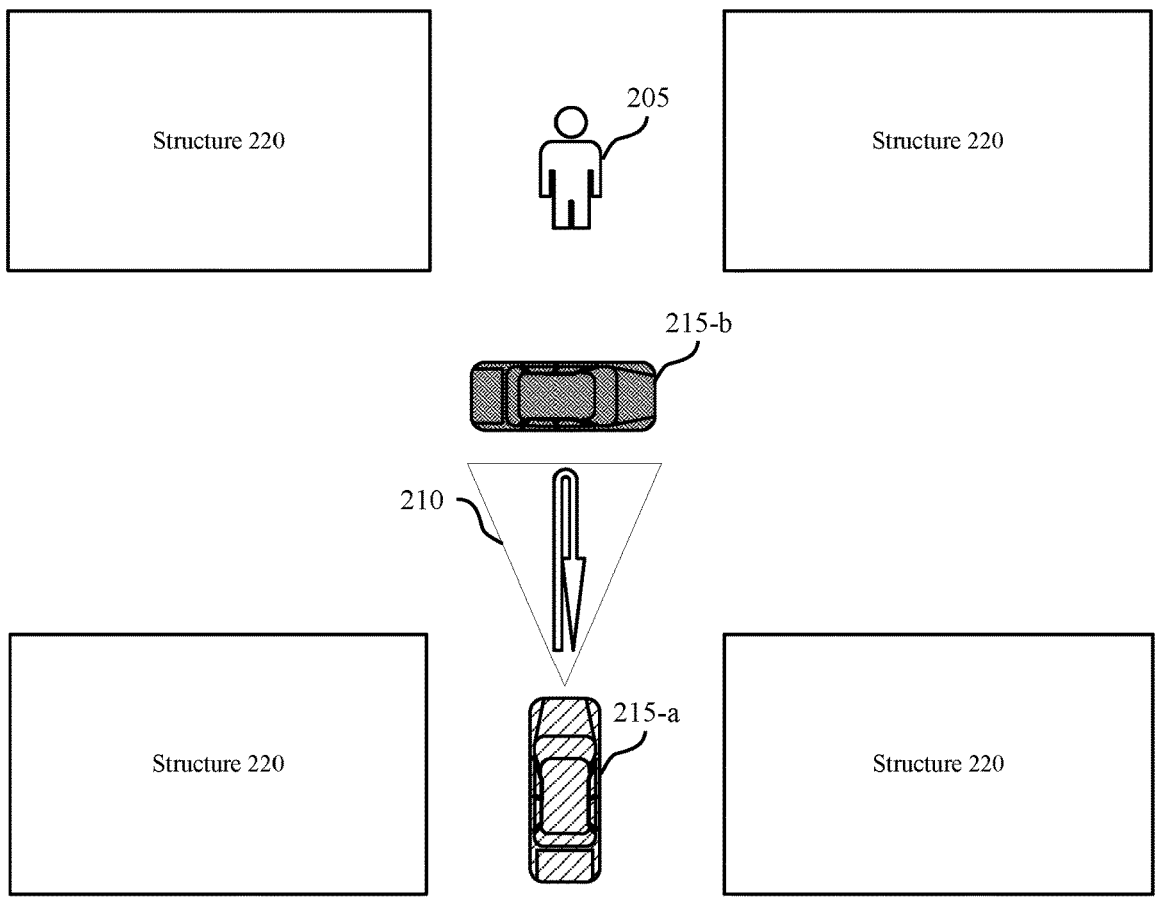
FIGS. 2A, 2B, 3A, 3B, and 4 illustrate examples of a wireless communications system that supports cooperative vehicular radar sensing in accordance with aspects of the present disclosure.

FIG. 2A illustrates an example of a wireless communications system 200 that supports cooperative vehicular radar sensing in accordance with aspects of the present disclosure. In some examples, wireless communications system 200 may implement aspects of wireless communication system 100. Wireless communications system 200 may include various UEs 215 (e.g., UE 215-a and UE 215-b), which may be examples of corresponding devices described with reference to FIG. 1. UEs 215 may be vehicles (e.g., in a V2X system) equipped with radar transmitters, may be vehicles carrying or connected to UEs, or UEs carried by drivers of vehicles (e.g., UEs 215), or the like.

In some examples, UEs 215 may perform radar sensing to identify one or more objects. For instance, UEs 215 may attempt to identify other UEs 215 (e.g., other vehicles, other devices carried by pedestrians or within other vehicles, or the like), pedestrians 205, structures 220, or the like. In performing radar sensing, a UE 215 may transmit and monitor for a radar waveform 210. For instance, UE 215-a may transmit radar waveform 210. UE 215-a may include one or more radar transmitters, which may be oriented in multiple directions to perform radar sensing in multiple directions. Radar transmitter may be mounted on driver or passenger doors, rear bumpers or trunks, front bumpers or hoods, or the like. For instance, a radar transmitter mounted on the front of UE 215-a may transmit radar waveform 210 in a forward direction (e.g., the direction viewed by the driver of UE 215-a). UE 215-a may monitor for a reflection of radar waveform 210. Radar waveform 210 may be, for instance, a frequency modulated continuous waveform (FMCW) waveform, and may sweep through a frequency range over time, as described in greater detail with reference to FIG. 2B.

Figure 2B:
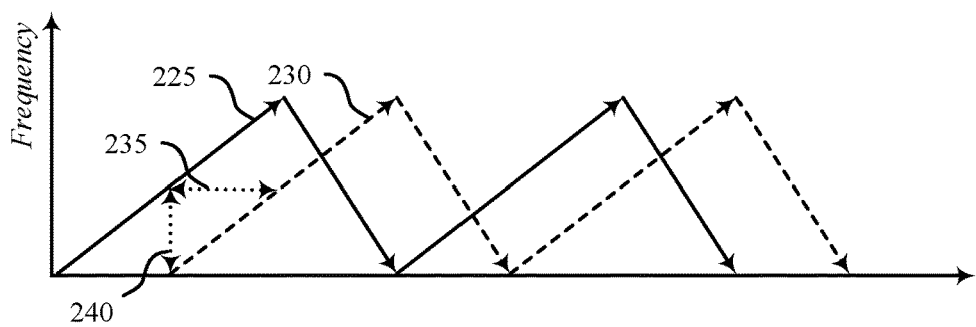

FIG. 2B illustrates an example of a radar waveform 201 that supports cooperative vehicular radar sensing in accordance with aspects of the present disclosure. A UE 215 may transmit one or more radar waveforms 201, as described herein. FIG. 2B is not necessarily shown to scale to allow for clearer illustration and description; time and/or frequency durations may be relatively shorter (or longer) than shown. In some examples, radar waveform 201 may implement aspects of wireless communication system 100. For instance, a UE 215 may transmit one or more waveforms as described with reference to FIGS. 1 and 2A.

A UE 215 (e.g., a vehicle such as UE 215-a) may support radar sensing by transmitting a radar waveform 225 and detecting a reflected radar waveform 230. The radar waveform 225 may be, for example, an FMCW waveform. In some cases, the radar waveform 225 may be defined by one or more parameters, which may include a radar chirp, frequency range, sweeping direction, sweeping rate, sweeping timing, or the like. A single chirp of radar waveform 225 may include sweeping in frequency (e.g., starting at a low frequency and increasing in frequency over time). For instance, a chirp of radar waveform 225 may sweep up from a first frequency (e.g., about 76 GHz, though other frequencies may be used, for example other mmW frequencies) to a higher frequency (e.g., about 77 GHz, though other frequencies, and ranges from the first frequency, may be used, for example other mmW frequencies) over a first time period, and may then sweep back down from the higher frequency to the first frequency over a second time period. The first and second time period may be the equal, the first time period may be longer than the second time period, or the second time period may be longer than the first time period. In some cases, UE 215-a may transmit multiple consecutive chirps for the radar waveform 225. For example, once one chirp completes a frequency sweep (e.g., just up, or up and down, or just down), UE 215-a may transmit a second chirp.

UE 215-a may receive a reflected chirp after a delay 235. For example, the radar waveform 225 may be reflected off an object, such as another UE 215-b, a stationary object (e.g., a structure 220), a pedestrian 205, or the like. The reflected radar waveform 230 may, in some cases, have a same waveform as the radar waveform 225. The delay may correspond to a propagation delay between UE 215-a transmitting the radar waveform 225, the radar sensing signal reflecting off of the object (e.g., UE 215-b), and the reflected radar waveform 230 travelling back to UE 215-a.

To determine the propagation delay, UE 215-a may determine a frequency difference between the radar waveform 225 and the reflected radar waveform 230. For example, UE 215-a may determine a beat frequency 240 between the radar waveform 225 and the reflected radar waveform 230. The beat frequency 240 may be proportional to the delay and therefore the distance between UE 215-a and the reflecting object. The beat frequency 240 may be an output of mixing the radar waveform 225 and the reflected radar waveform 230.

UE 215-a may also determine direction or velocity information based on transmitting multiple chirps. For example, UE 215-a may identify a target's velocity based on a doppler spectrum of the multiple reflected chirps in the reflected radar waveform 230. Additionally, or alternatively, UE 215-a may identify a target direction on a direction of arrival of the reflected radar waveform 230. For example, a device receiving an FMCW waveform may determine a range spectrum of the transmitting device.

In some examples, as illustrated with reference to FIG. 2A, a UE 215 may experience radar interference or blockage. In some cases, an object may block a radar target, resulting in failure to detect that object. For instance, UE 215-*a* may transmit radar waveform 210 (e.g., as described with reference to FIG. 2B), and may monitor for a reflection of radar waveform 210. Radar waveform 210 may reflect off of UE 215-*b*. However, due to the location of UE 215-*b*, radar waveform 210 may not reach or be reflected off of pedestrian 205. In such examples, UE 215 may fail to detect or identify the presence, location, velocity, or the like, of pedestrian 205. Similarly, other UEs 215, other pedestrians 205, or other obstacles may be invisible with respect to radar sensing for UE 215-*a* (e.g., as a result of the locations of one or more radar targets, the location of one or more structures 220), or the like.

Additionally, or alternatively, a UE 115 may experience interference from other UEs 215. For instance, UE 215-*b* may also transmit one or more radar waveforms 210. In some examples, a radar waveform (e.g., FMCW) transmitted by one UE 215 may be indistinguishable from another radar waveform transmitted by another UE 215. Thus, a radar waveform transmitted by UE 215-*b* may be indistinguishable from a reflection of radar waveform 210 transmitted by UE 215-*a*. In such examples, UE 215-*a* may erroneously interpret a direct transmission of a radar waveform from UE 215-*b* as a reflection of radar waveform 210. UE 215-*a* may then interpret the received waveform and wrongly identify a false or ghost radar target (e.g., located halfway between UE 215-*b* and UE 215-*a*) based on the received radar waveform at a high power.

Falsely identify non-existent targets, erroneously identifying a real radar target at the wrong location, failing to identify a radar target (e.g., pedestrian 205) may result in decreased traffic efficiency, increased likelihood of accidents and collisions, decreased user safety, decreased pedestrian and traffic safety, increased traffic congestion, and decreased user experience.

In some examples, as described in greater detail with reference to FIGS. 3A, 3B, 4A, 4B, and 5, UEs 215 may perform cooperative radar sensing. UEs 215 may exchange radar measurement reports, including values for one or more parameters (e.g., object position, object velocity, object orientation, and respective uncertainty levels for each parameter) for a particular radar target at a particular time stamp. Various UEs 215 may combine the values to decrease uncertainty levels for each parameter value, may add identified radar targets to stored lists of radar targets, or both. UEs 215 may exchange such radar measurement reports via sidelink messages, such as broadcast messages, unicast messages, or the like.

Figure 3A:
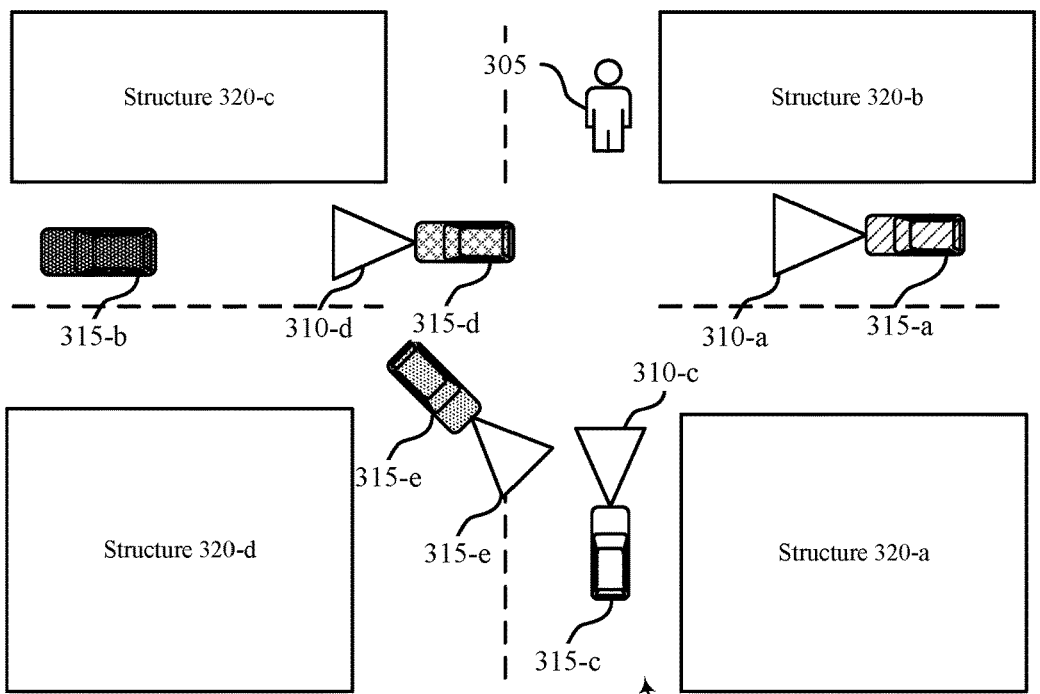

FIG. 3A illustrates an example of a wireless communications system 300 that supports cooperative vehicular radar sensing in accordance with aspects of the present disclosure. In some examples, wireless communications system 300 may implement aspects of wireless communication system 100. Wireless communications system 300 may include one or more UEs 315 (e.g., UE 315-*a*, UE 315-*b*, UE 315-*c*, UE 315-*d*, and UE 315-*e*), which may be examples of corresponding devices as described with reference to FIGS. 1, 2A, and 2B. FIG. 3A illustrate various UEs 315 as physically located in wireless communications system 300.

Figure 3B:
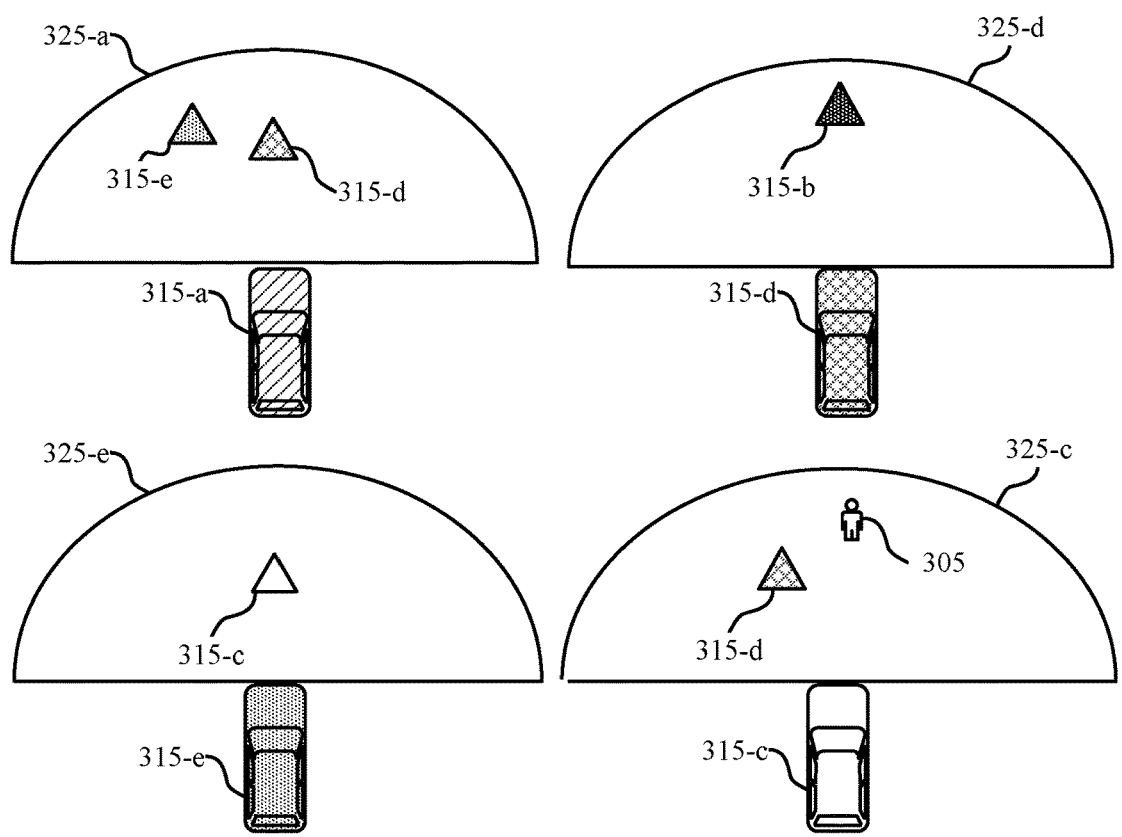

FIG. 3B illustrates an example of a wireless communications system 301 that supports cooperative vehicular radar sensing in accordance with aspects of the present disclosure. In some examples, wireless communications system 301 may implement aspects of wireless communication system 100. Wireless communications system 301 may include one or more UEs 315 (e.g., UE 315-*a*, UE 315-*c*, UE 315-*d*, and UE 315-*e*), which may be examples of corresponding devices as described with reference to FIGS. 1, 2A, and 2B. For instance, FIG. 3B illustrate various UEs 315 and their respective sensing coverage based on their physical location within wireless communications system 300.

In some examples, UEs 315 may perform radar sensing to identify objects (e.g., other vehicles (e.g., UEs 315), pedestrians 305, structures 320, or the like. For instance, UEs 215 may operate in and around an intersection, as illustrated with reference to FIG. 3A. UEs 315 may navigate with respect to other UEs 315, structures 320 (e.g., structure 320-*a*, structure 320-*b*, structure 320-*c*, and structure 320-*d*). UEs 315 may also communicate with one or more base stations (e.g., base stations 105 as described with reference to FIG. 1). Base stations may be a roadside unit (RSU), such as a smart stoplight at an intersection, a base station, a repeater, or the like.

UEs 315 may transmit radar waveforms 310, as described with reference to FIGS. 2A and 2B. UEs 315 may monitor for reflections of transmitted radar waveforms to identify one or more parameter values for each locally positioned object within wireless communications system 300. However, some UEs 315 may be limited in their radar sensing by blockage, interference, radar sensing range, or the like. Thus, a UE 315 may not be able to identify all relevant radar targets (e.g., all relevant objects, including structures 320, pedestrians 305 UEs 315, or other objects such as trees, medians, barriers, crossing gates, or the like). Thus, each UE 315 may use radar sensing to identify radar targets located within respective sensing coverages 325, but some UEs 315 may be unable to identify all relevant radar targets.

For example, UE 315-*a* may transmit radar waveform 310-*a*. UE 315-*a* may receive a reflection of radar waveform 310-*a* off of UE 315-*d* (e.g., which may be driving in front of UE 315-*a*), and may receive a reflection of radar waveform 310-*b* off of UE 315-*e* (which may be turning away from UE 315-*a* down another street between structure 320-*d* and structure 320-*a*). UE 315-*a* may thus identify UE 315-*d* and UE 315-*e* within sensing coverage 325-*a*. However, UE 315-*d* may be located between UE 315-*a* and 315-*b*. Thus, radar waveform 310-*a* may not reach UE 315-*b*, and E 315-*a* may not be able to determine any parameter values (e.g., position, velocity, orientation, etc.) for UE 315-*b* because of blockage caused by UE 315-*d*. In some examples, UE 315-*b* may be located outside the effective range of UE 315-*a*, and UE 315-*a* may not be able to sense UE 315-*b* even if UE 315-*d* were not located between UE 315-*a* and UE 315-*b*. Similarly, due to the position of structure 320-*b*, radar waveform 310-*a* may not reach or reflect off of pedestrian 305. Pedestrian 305 may be approaching a crosswalk toward which UE 315-*a* is driving. Thus, parameter values for pedestrian 305 (e.g., position, velocity, orientation, etc.) may be particularly relevant for UE 315-*a*. For instance, UE 315-*a* may prepare safety precautions when an approaching pedestrian is detected. However, UE 315-*a* may not sense pedestrian 305, and thus may fail to prepare such safety measures.

Similarly, UE 315-*d* may transmit radar waveform 310-*d*, which may reflect off of UE 315-*b*. UE 315-*d* may thus sense UE 315-*b* within sensing coverage 325-*d*, and may be able to identify one or more parameter values for UE 315-*b*. However, UE 315-*d* may be unable to sense UE 315-*e* (e.g., which may be next to or behind UE 315-*d*), may be unable to sense pedestrian 305 (e.g., based on the location of pedestrian 305, or blockage generated by a structure 320), or may be unable to sense UE 315-*c* (e.g., based on the location of UE 315-*c* on the other side of UE 315-*e*), or the like.

UE 315-*c* may sense pedestrian 305 (e.g., who may be located directly in front of UE 315-*e* without any blockage or interference) within sensing coverage 325-*c*, but may be unable to sense one or more of UE 315-*e*, UE 315-*d*, UE 315-*b*, and UE 315-*a* (e.g., because of their respective locations with reference to each other, structures 320-*a*, or the like). UE 315-*e* may sense UE 315-*c* within sensing coverage 325-*e*, but may be unable to sense one or more of UE 315-*b*, UE 315-*d*, UE 315-*a*, and pedestrian 305 (e.g., based on the location, orientation, or direction of other UEs, or the location of structures 320, or the like).

Additionally, or alternatively, in some cases, UEs 315 may sense each other, but may erroneously determine one or more parameter values (e.g., position, velocity, or the like) based on interference. For instance although UE 315-*a* may be able to sense UE 315-*d*, if UE 315-*d* were to transmit a radar waveform in a reverse direction (e.g., toward UE 315-*a*), then UE 315-*a* may erroneously determine that UE 315-*d* is located halfway between UE 315-*a* and the actual location of UE 315-*d*. UE 315-*a* may erroneously identify a very low uncertainly level associated with the position parameter value of UE 315-*d*, based on the high power at which UE 315-*a* received a radar waveform transmitted by UE 315-*d*. Thus, UE 315-*a* may erroneously determine that it should brake, swerve, or otherwise take safety measures based on a ghost or falsely detected radar target (e.g., when UE 315-*d* is actually located a safe distance ahead of UE 315-*a*.

Thus, UEs 315 may experience interference, blockage, or the like, which may result in a failure to identify actual radar targets, or erroneously detecting false radar targets, or the like. However, each UE 315 may have at least some relevant information regarding objects located within wireless communications system 300.

In some examples, UEs 315 may perform cooperative radar sensing, and may share information regarding sensed radar targets with each other. UEs 315 may transmit, to each other, radar measurement reports including values for one or more parameters for each detected radar target at a particular time. Each radar measurement report may include parameter values, including values for parameters such as position, velocity, orientation, radar cross section, direction of angle, signal strength, or the like. Each set of values may correspond to a radar target, and a timestamp, that may be included in the set of values. UEs 315 may exchange periodically, or on demand, on sidelink resources negotiated between UEs 315, indicated by a base station, or a combination thereof, as described in greater detail with reference to FIGS. 4 and 5.

Figure 4:
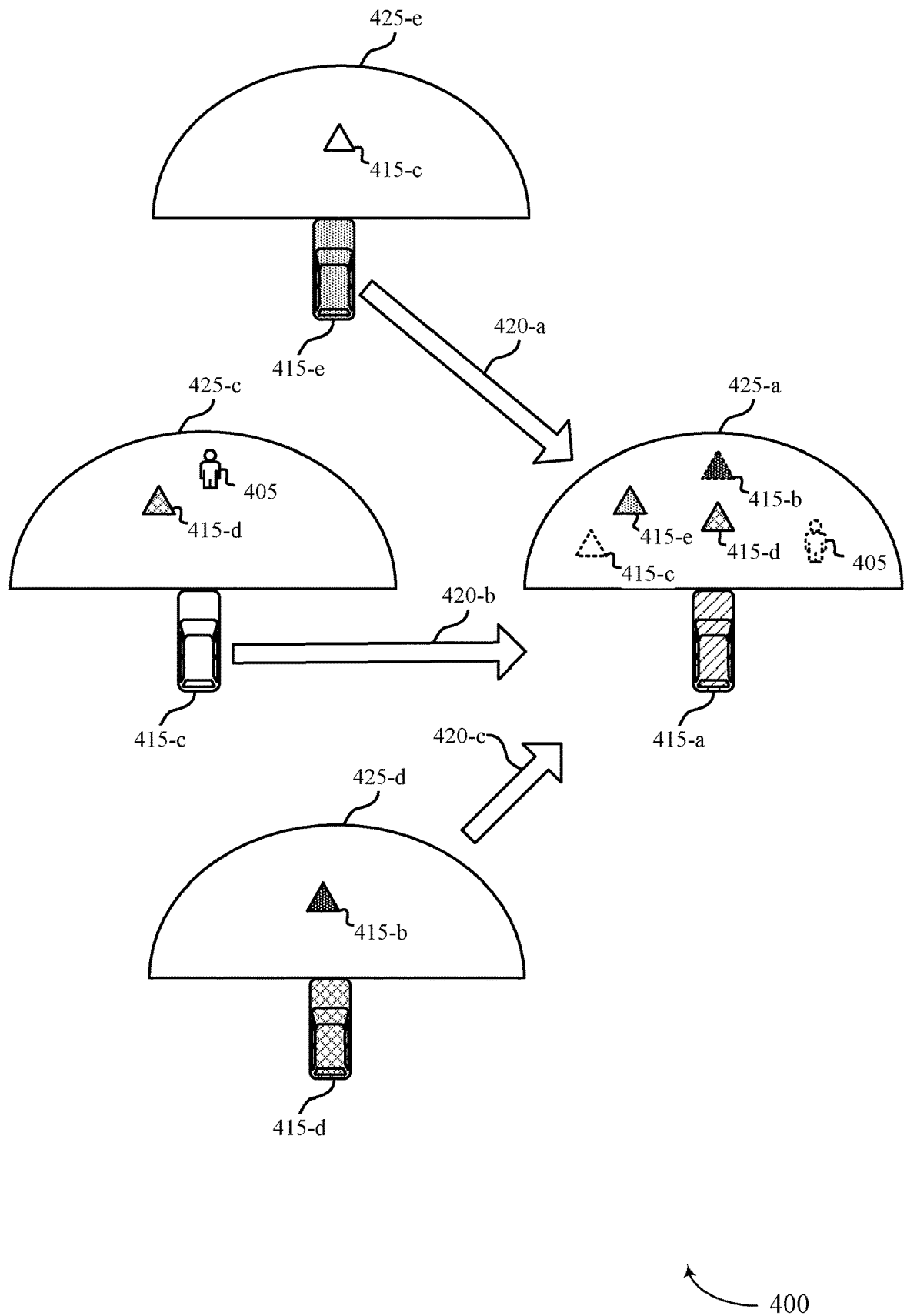

FIG. 4 illustrates an example of a wireless communications system 400 that supports cooperative vehicular radar sensing in accordance with aspects of the present disclosure. In some examples, wireless communications system 400 may implement aspects of wireless communication system 100. Wireless communications system 400 may include UE 415-*a*, UE 415-*b* c, UE 415-*d*, and UE 415-*e*, which may be examples of corresponding devices with reference to FIGS. 3A and 3B. UEs 415 may communicate, in some examples, with one or more base stations. For instance, UEs 415 may communicate with an RSU, such as a smart light, or the like. In some examples, UEs 415 may communicate with each other via sidelink resources. UEs 415 may operate according to a global clock. The global clock may be based on sidelink synchronization (e.g., synchronized V2X channels), or may be based on GPS coordination, or the like. Each UE 415 may be able to determine their own respective parameter values, such as location, velocity, orientation, or the like (e.g., via radar sensing, or GPS information, or one or more algorithms, or the like).

UEs 415 may perform cooperative radar sensing, as described with reference to FIGS. 2A, 2B, 3A, and 3B. Each UE 415 may sense one or more objects, and may determine one or more parameter values for the detected objects within a corresponding sensing coverage 425. For instance, parameters for sensed radar targets may include position, velocity, orientation, or the like. Parameters for sensed radar targets may further include estimated radar cross sections, signal strengths, etc. UEs 415 may also determine or calculate an uncertainty level (e.g., a confidence level) for each detected radar target. Parameter values for each detected radar target may be organized into lists (e.g., tuples), where each tuple is associated with radar measurements taken for a particular radar target at a particular time (e.g., a time stamp).

UEs 415 may perform cooperative radar sensing by transmitting sidelink messages including the parameter values, uncertainty levels, timestamp, and other relevant information. For instance, UEs 415 may exchange radar measurement reports 420 over sidelink resources. UEs 415 may transmit radar measurement reports according to a schedule negotiated via sidelink connections, or implicitly determined, or instructed by an RSU, or the like, as described herein. Each radar measurement report 420 may include a time stamp (e.g., a time at which measurements include in the radar measurement report were taken according to a global clock). Each radar measurement report 420 may further include radar detection results associated with the time stamp. For instance, radar measurement report 420 may include a list of targets specified as tuples (e.g., lists of parameter values) and uncertainty levels associated with each parameter value. As described herein, parameters may include velocity, position, orientation, radar cross-section, signal strength, or the like, for each radar target sensed at the indicated time stamp. Each radar measurement report 420 may also include a list of parameter values and uncertainty levels at the timestamp for the transmitting UE 415.

UE 415-*e* may transmit radar measurement report 420-*a*. UE 415-*e* may be able to sense UE 415-*c* within sensing coverage 425-*e*. Radar measurement report 420-*a* may thus include a timestamp at which measurements were taken, parameter values measured by UE 415-*e* for UE 415-*c*, uncertainty values for the parameter values measured by UE 415-*e* for UE 415-*c*, parameter values for UE 415-*e*, uncertainty values for sets of parameter values for UE 415-*c*, or any combination thereof. In some example, UE 415-*e* may also include a UE identifier for UE 415-*e* (e.g., associated with or included in the set of parameter values for UE 415-*e*), and a UE identifier for UE 415-*c* (e.g., associated with or included in the set of parameter values for UE 415-*c*). Radar measurement report 420-*a* may be a sidelink broadcast message, received by UE 415-*a*, UE 415-*c*, and UE 415-*d*. In some cases, radar measurement report 420-*a* may be a sidelink unicast message transmitted to and received by UE 415-*a*.

UE 415-*a* may receive one or more radar measurement reports 420, and may combine the information received in the measurement reports with each other, or with information determined or measured by UE 415-*a*, or both. That is, UE 415-*a* may fuse the received messages together, or with its own measurements if available. For example, a particular radar target may appear in multiple radar measurement reports 420 as multiple tuples associated with time stamps and uncertainty values. In some examples, UE 415-*a* may determine that different tuples are associated with the same or with different tuples based on a smart algorithm, a determination of variations or similarities in parameter values, an explicit indication from the transmitting UE 415, or any combination thereof. UE 415-a may generate a new set of parameter values and uncertainty levels for a particular radar target by combining the tuples for that radar target associated with the same time stamp. In some examples, parameter values with uncertainty at different time stamps may be propagated temporally to a target time stamp as follows: $(x_1, v_i, \sigma_{x_1}^2, \sigma_{v_1}^2) \mapsto (x+v\Delta t, v, \delta_x^2+\sigma_v^2\Delta t^2, \sigma_v^2)$, where x=position, v=velocity, $\sigma_{x_1}^2$=an uncertainty level for position for a first radar target, and $\sigma_{v_1}^2$=uncertainty level for velocity for the first radar target.

UE 415-a may combine multiple tuples at the same time stamp (e.g., multiple sets of parameter values for a same radar target at a same time stamp) to yield new tuples (e.g., new lists of parameter values) with smaller uncertainty levels. For instance, UE 415-a may combine a first tuple including a first velocity value ($v_1$), a first position value ($x_1$), a first uncertainty value for the first position value ($\sigma_{x_1}^2$) and a first uncertainty value for first the velocity value ($\sigma_{v_1}^2$) with a second tuple including a second velocity value ($v_2$), a second position value ($x_2$), a second uncertainty value for the second position value ($\sigma_{x_2}^2$) and a second uncertainty value for the second velocity value ($\sigma_{v_2}^2$) as follows:

$$\left(x_1, v_1, \sigma_{x_1}^2, \sigma_{v_1}^2\right), \left(x_2, v_2, \sigma_{x_2}^2, \sigma_{v_2}^2\right) \mapsto$$

$$\left( \frac{\frac{x_1}{\sigma_{x_1}^2} + \frac{x_2}{\sigma_{x_2}^2}}{\frac{1}{\sigma_{x_1}^2} + \frac{1}{\sigma_{x_2}^2}}, \frac{\frac{v_1}{\sigma_{v_1}^2} + \frac{v_2}{\sigma_{v_2}^2}}{\frac{1}{\sigma_{v_1}^2} + \frac{1}{\sigma_{v_2}^2}}, \frac{1}{\frac{1}{\sigma_{x_1}^2} + \frac{1}{\sigma_{x_2}^2}}, \frac{1}{\frac{1}{\sigma_{v_1}^2} + \frac{1}{\sigma_{v_2}^2}} \right).$$

By combining tuples received in radar measurement reports 420, UE 415-a may both identify radar targets otherwise not detected by UE 415-a, and may decrease the uncertainty levels of radar targets detected by UE 415-a. For example, UE 415-a may successfully detect UE 415-d and UE 415-e within sensing coverage 425-a (e.g., as described in greater detail with reference to FIG. 3A where UE 415-a may correspond to UE 315-a sensing within sensing coverage 325-a). However, due to detection range, obstacles, or interference, UE 415-a may fail to detect (or accurately detect) UE 415-c, UE 415-b, and pedestrian 405. UE 415-a may receive radar measurement report 420-a, which may include a set of parameter values for UE 415-c, a timestamp (e.g., a time at which UE 415-e performed radar sensing and detected UE 415-c, a propagated time-value for the set of parameter values, or the like), uncertainty levels for each for each of the parameter values, a UE identifier for UE 415-c, or any combination thereof. Using the information received from UE 415-e in radar measurement report 420-a, UE 415-a may determine that it has no information (e.g., or no current information) about UE 415-c, and may add UE 415-c to a list of detected radar targets. In some examples, radar measurement report 420-a may also include a set of parameter values for UE 415-e, a timestamp (e.g., the same timestamp as indicated for the set of parameter values for UE 415-c), a UE identifier for UE 415-e, or any combination thereof. UE 415-a may have its own measured set of parameter values and uncertainty levels for UE 415-e based on the radar sensing performed by UE 415-a. However, UE 415-a may combine the set of parameter values for UE 415-e received in the radar measurement report 420-a with its own set of parameter values for UE 415-e, resulting in a combined set of radar measurement parameter values with decreased uncertain levels. If, for example, UE 415-a had falsely determined that UE 415-e was closer than the actual location of UE 415-e, then the combination of tuples may result in a more accurate determination of the location of UE 415-e. Increased confidence values (e.g., decreased uncertainty levels) may result in UE 415-a more accurately taking (or avoiding) safety measures to avoid a collision with UE 415-e.

Similarly, UE 415-c may sense UE 415-d and pedestrian 405 within sensing coverage 425-c. UE 415-c may transmit radar measurement report 420-b including sets of parameter values, uncertainty levels, a time stamp, and one or more device or target identifiers. Radar measurement report 420-b may also include a set of parameter values for UE 415-c, including uncertainty values, the time stamp, a UE identifier for UE 415-c, or any combination thereof. UE 415-a may add UE 415-c and pedestrian 405 to a list of radar targets. In some examples, UE 415-a may receive a set of parameter values for UE 415-c from UE 415-e in radar measurement report 420-a, and may receive a set of parameter values for UE 415-c from UE 415-c in radar measurement report 420-b. In such cases, UE 415-a may combine the set of parameter values received for UE 415-c from UE 415-e and the set of parameter values (at the same timestamp) for UE 415-c from UE 415-c, resulting in a new set of parameter values for UE 415-c with lower uncertainty levels. UE 415-d may be able to sense UE 415-b within sensing coverage 425-b, and may transmit a radar measurement report 420-c including a set of parameter values (e.g., including uncertainty levels for each parameter) and an indication of the time stamp (e.g., the same time stamp as indicated in radar measurement report 420-a and radar measurement report 420-b). Radar measurement report 420-c may also include a set of parameter values (e.g., including uncertainty levels for the rest of the parameters) associated with the same time stamp for UE 415-d. UE 415-a may receive radar measurement report 420-c, and may add UE 415-b to a list of radar targets. Without receiving radar measurement report 420-c, UE 415-a may be unable to detect UE 415-b (e.g., as a result of blockage by UE 415-d, limited sensing range, or both). However, having received radar measurement report 420-c including the set of parameter values for UE 415-b, UE 415-a may add UE 415-b to the list of detected radar targets, effectively increasing the sensing range and sensing accuracy of UE 415-a. UE 415-a may also transmit a radar measurement report 420, which may include sets of parameter values (e.g., including uncertainty levels) and an indication of the time stamp to one or more of UE 415-e, UE 415-c, and UE 415-d. Such a radar measurement report 420 may include a set of parameter values for UE 415-e, a set of radar measurement parameters for UE 415-d, and a set of radar measurement parameters for UE 415-a (e.g., as well as UE identifiers for each of the reported UEs 415, or just a UE identifier for UE 415-a).

In some examples, UEs 415 may exchange radar measurement reports 420 periodically. UEs 415 may independently negotiate periodic sidelink resources on which to periodically transmit radar measurement reports 420. In some examples, a base station (e.g., an RSU) may allocate periodic resources for transmitting radar measurement reports 420.

In some examples, UEs 415 may exchange radar measurement reports 420 in an on-demand configuration. For instance, UE 415-a may transmit a sidelink message requesting transmission of radar measurement reports 420

(e.g., from any UE 415 that receives the request, or that is within a predetermined, predefined, configured, or standardized distance from UE 415-*a*, or both). Upon receiving the sidelink request message, UE 415-*e*, UE 415-*c*, and UE 415-*d* may transmit radar measurement report 420-*a*, radar measurement report 420-*b*, and radar measurement report 420-*b*, respectively. In some examples, UE 415-*a* may perform a handshake operation with other UEs 415. For instance, UE 415-*a* may transmit an indication of a set of sidelink resources that are available for communicating radar measurement reports 420, or for transmitting sidelink request messages, or both. In such cases, other UEs 415 may provide a second set of sidelink resources (or an indication of a subset of the first set of sidelink resources) that are available for communicating radar measurement reports 420, or for transmitting or receiving sidelink request messages, or both. In such examples, responsive to the received message indicating the second set of sidelink resources, UE 415-*a* may transmit the request for radar measurement reports 420 on at least some of the indicated second set of sidelink resources (e.g., during a portion of the first set of sidelink resources that overlap with the second set of sidelink resources).

By performing cooperative radar sensing as described herein, UEs 415 may extend the range of radar sensing, enable around-corner detection, perform non-coherent combining of data, and increase detection diversity. UEs 415 may improve their own detection and each other's detection, resulting in improved detection range, improved tracking, improved early alerts of sudden or pending incidence or vulnerable targets (e.g., a sudden appearance of another UE 415, a pedestrian 405, a pending collision, or the like).

Figure 5:
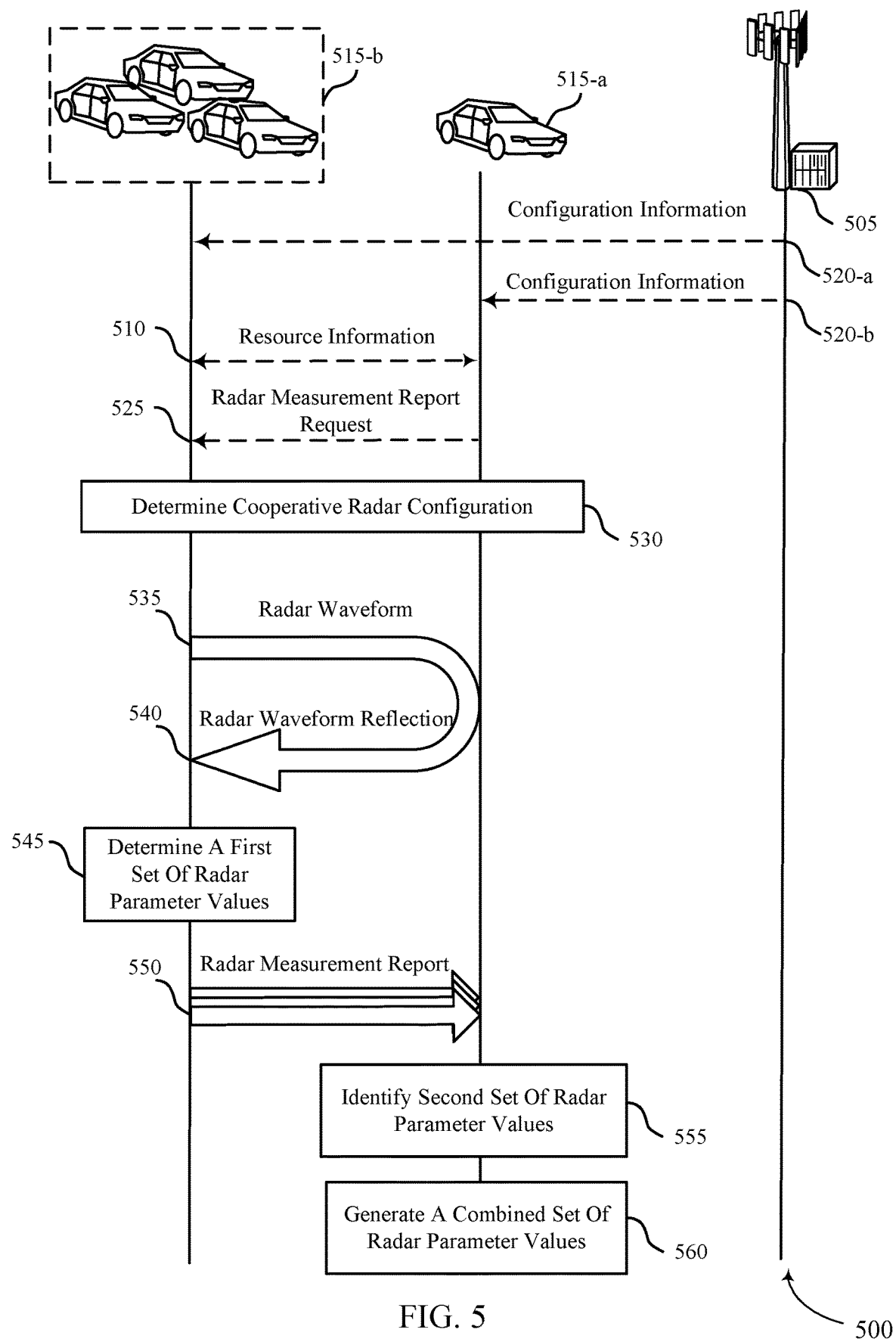
FIG. 5 illustrates an example of a process flow that supports cooperative vehicular radar sensing in accordance with aspects of the present disclosure.

FIG. 5 illustrates an example of a process flow 500 that supports cooperative vehicular radar sensing in accordance with aspects of the present disclosure. In some examples, process flow 500 may implement aspects of wireless communication system 100. Process flow 500 may include one or more UEs 515 (e.g., UE 515-*a* and UEs 515-*b*), and a base station 505, which may be examples of corresponding devices described with reference to FIGS. 2A through 4. Base station 505 may be an example of an RSU (e.g., a smart stop light, a repeater, a node, or the like). UEs 515 may transmit one or more radar measurement reports, which may be examples of radar measurement report 430 as described with reference to FIG. 4. In some examples, UEs 515 may communicate with each other to perform cooperative radar sensing.

At 520, base station 505 may transmit configuration information, including a configuration to perform cooperative radar sensing, to a number of UEs 515. In some cases, at 520-*a*, base station 505 may transmit a downlink unicast message to UE 515-*a* including an allocation of sidelink resources to perform cooperative radar sensing (e.g., resources on which to transmit radar measurement reports at 550). In some cases, at 520-*b*, base stations 505 may transmit a second downlink unicast message to another UE 515-*b* including an allocation of sidelink resources for transmitting and receiving radar measurement reports at 550. In some examples, base station 505-*a* may transmit a single message (e.g., a broadcast message) at 520-*a* and 520-*b* including the configuration information.

In some examples, the configuration information may allocate periodic sidelink resources for periodic sidelink transmissions at 550. The periodic transmissions may be based on a global clock. The global clock may be identified using the global positioning system (GPS), synchronization information from a sidelink connection between UE 515-*a* and one or more UEs 515-*b*, or both.

At 510, UEs 515 may negotiate sidelink resources on which to perform cooperative radar sensing. For example, UE 515-*a* may transmit an indication of sidelink resources on which it is able to transmit or receive radar measurement reports. One or more UEs 515-*b* may transmit, and UE 515-*a* may receive, an indication of sidelink resources on which UEs 515-*b* are capable of transmitting or receiving radar measurement reports. In such examples, UEs 515 may determine sidelink resources (e.g., sidelink resources indicated by both UE 515-*a* and UEs 515-*b* as being available) for communicating the radar measurement report) on which to communicate the radar measurement report. Such negotiations may be done independently (e.g., without receiving configuration information at 520-*a* and 520-*b*. In some examples, UEs 515-*a* and 515-*b* may receive configuration information providing some sidelink resource information, and UEs 515-*a* and 515-*b* may further negotiate available resources (e.g., based on the configuration information) at 510. In some examples, sidelink resources for communicating radar measurement reports may be standardized or preconfigured, indicated or allocated in the configuration information, or both.

At 525 (e.g., if UEs 515 are operating in an on-demand configuration), UE 515-*a* may transmit a radar measurement report request to UEs 515-*b*. The radar measurement report request may indicate one or more sets of resources for UE 515-*a* to receive radar measurement reports. The radar measurement report request may be a sidelink message, and may be broadcast to multiple UEs 515-*b* or unicast to a single UE 515-*b*.

At 530, UEs 515 may determine a cooperative radar configuration. In some cases, determining the cooperative radar configuration may be based on the indication of a configuration to perform cooperative radar sensing received at 520. In such cases, UE 515-*a* and UEs 515-*b* may determine resources for transmitting and receiving a radar measurement report request, or periodic resources for transmitting the radar measurement reports, at 550. In some cases, determining the cooperative radar configuration may be based on a radar measurement report request 525. In such cases, UEs 515-*b* may determine resources on which to transmit the radar measurement report based on signaling at 520, or based on an allocation of resources received at 525, or a combination thereof.

At 535, UE 515-*b* may transmit one or more radar waveforms in one or more directions and may monitor for reflections of the radar waveforms. Each radar waveform may be transmitted in chirps that sweep through a frequency range over time. UEs 515-*b* may transmit the radar waveforms in the direction of UE 515-*a*, in other directions (e.g., towards each other), and may detect other UEs 515, pedestrians, objects, obstructions, or the like.

At 540, UE 515-*b* may receive the reflections of the transmitted one or more waveforms. Reflections of the same waveform chirps may be received after a time delay. The delay may be proportional to a distance between a transmitting UE 515-*b* and UE 515-*a*. With multiple waveform chirps, the transmitting UE 515-*a* may be able to identify one or more parameter values for UE 515-*a* and other UEs 515-*b* (e.g., velocity, orientation, position, and the like).

At 545, UE 515-*b* may determine a first set of radar measurement parameter values describing a detected radar target (e.g., other UEs 515-*b*). The first set of radar measurement parameter values may include a position measurement, a position uncertainty value, a velocity measurement, a velocity uncertainty value, an orientation measurement, an orientation uncertainty value, a radar cross-section measurement, a radar cross-section uncertainty level, a signal strength measurement, a signal strength uncertainty level, or any combination thereof. In some examples, the first set of radar measurement parameter values may pertain to the transmitting UE 515-*b*, or a UE 515-*b* detected by the transmitting UE 515-*b*, or both. In some cases, the first set of radar measurement parameter values may be determined based on a universal reference frame, known by all UEs 515 (e.g., based on GPS). In some cases, the first set of radar measurement parameter values may be defined based on a reference frame associated with the measuring UE 515-*b*. The first set of radar measurement parameter values may include a time stamp and a UE identifier associated with UE 515-*b*, or a measured UE 515, or UE identifiers for both.

At 550, UEs 515-*b* may transmit one or more radar measurement reports to UE 515-*a* over the indicated resource configuration. UE 515-*a* may receive the one or more radar measurement reports. The radar measurement reports may be unicast sidelink messages addressed to UE 515-*a*, or may be broadcast sidelink messages.

At 555, UE 515-*a* may identify a second set of radar measurement parameter values. The identification of the second set of radar measurement parameter values may be based on the reception of the radar measurement report 550. For instance, the second set of radar measurement parameter values may be for the same radar target as the first set of radar measurement parameter values and associated with the same time stamp, but may be received in another radar measurement report from another UE 215-*b*. In some examples, UE 515-*a* may transmit one or more radar waveforms in one or more directions and may monitor for reflections of the radar waveforms. UE 515-*a* may receive the reflections of the transmitted waveforms, and may determine a second set of radar measurement parameter values defining the detected radar target at the same time stamp. The second set of radar measurement parameter values may include a position measurement, a position uncertainty value, a velocity measurement, a velocity uncertainty value, an orientation measurement, an orientation uncertainty value, a radar cross-section measurement, a radar cross-section uncertainty level, a signal strength measurement, a signal strength uncertainty level, or any combination thereof. In some cases, the second set of radar measurement parameter values may be determined based on a reference frame that is common to all local UEs 515. In some cases, the first set of radar measurement parameter values may be determined based on a reference frame associated with the measuring UE 515-*b*. The first second set of radar measurement parameter values may include a time stamp and a UE identifier associated with UE 515-*a*.

At 560, UE 515-*a* may generate a combined set of radar measurement parameter values associated with a first time stamp. UE 515-*a* may fuse the first set of radar measurement parameter values, the second set of radar measurement parameter values, and any additional sets of radar measurement parameter values associated with the first time stamp. The sets of radar measurement parameter values may be fused to produce a more accurate position measurement, velocity measurement, orientation measurement, radar cross-section measurement, signal strength measurement, and smaller respective uncertainties for a particular radar target. In some examples, Combining the sets of radar measurement parameter values may be based at least in part on a reference frame shared and communicated by a number of UEs 515. In some examples, combining the sets of radar measurement parameter values may be based at least in part on reference frames associated with different UEs.

Figure 6:
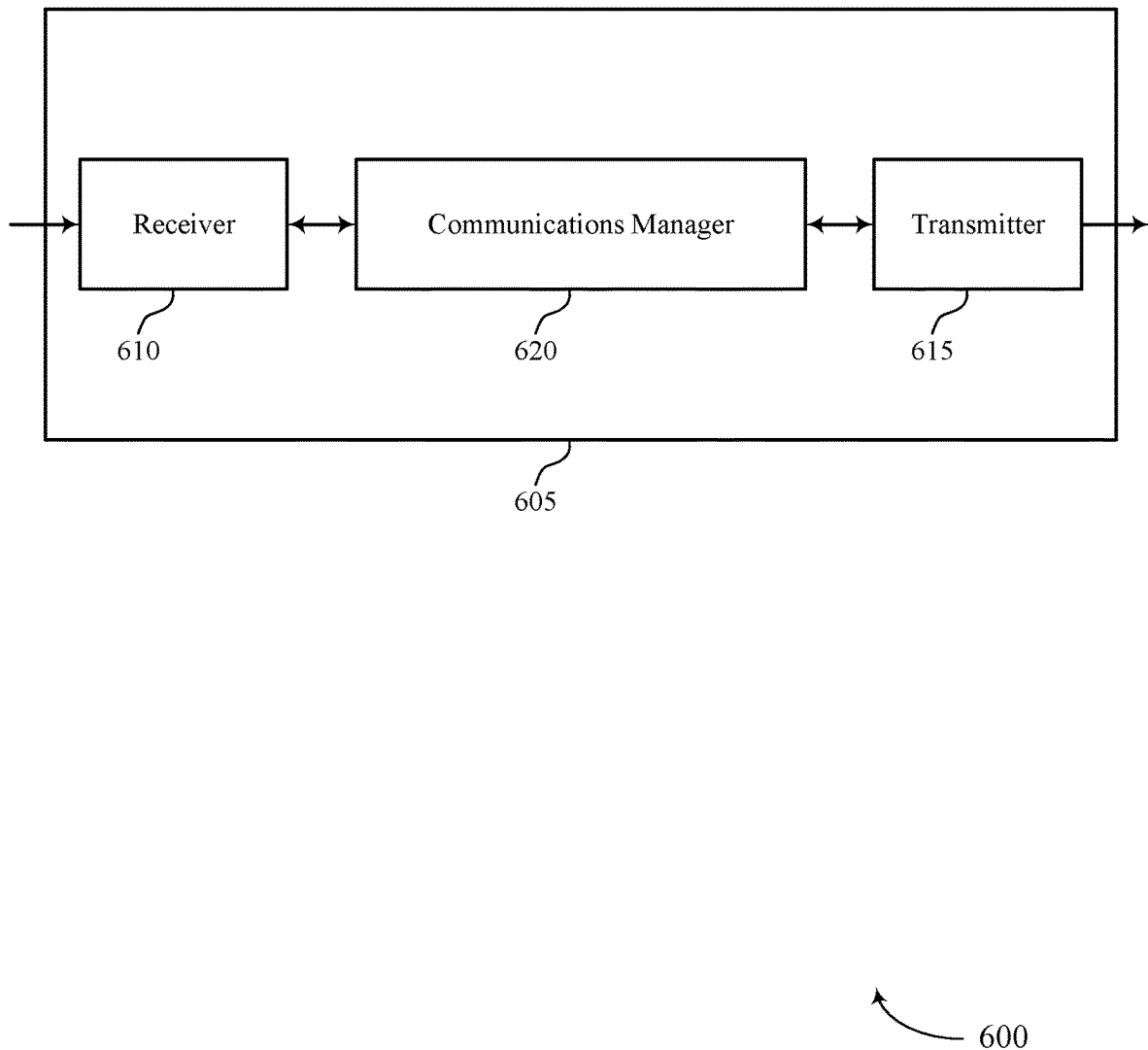
FIGS. 6 and 7 show block diagrams of devices that support cooperative vehicular radar sensing in accordance with aspects of the present disclosure.

FIG. 6 shows a block diagram 600 of a device 605 that supports cooperative vehicular radar sensing in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to cooperative vehicular radar sensing). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to cooperative vehicular radar sensing). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of cooperative vehicular radar sensing as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a first UE in accordance with examples as disclosed herein. For example, the communications manager 620 may be configured as or otherwise support a means for receiving an indication of a configuration to perform cooperative radar sensing, the configuration indicating resources for the first UE to use to communicate radar measurement reports. The communications manager 620 may be configured as or otherwise support a means for receiving, from a second UE according to the indicated configuration, a radar measurement report including a first set of values for one or more radar measurement parameters associated with a first radar target and an indication of a first time value associated with the first set of values. The communications manager 620 may be configured as or otherwise support a means for identifying, by the first UE, a second set of values for the one or more radar measurement parameters associated with the first radar target and the first time value. The communications manager 620 may be configured as or otherwise support a means for generating a combined set of values for the one or more radar measurement parameters associated with the first time value by combining the first set of values and the second set of values.

Additionally, or alternatively, the communications manager 620 may support wireless communications at a second UE in accordance with examples as disclosed herein. For example, the communications manager 620 may be configured as or otherwise support a means for receiving an indication of a configuration to perform cooperative radar sensing, the configuration indicating resources for the second UE to use to communicate radar measurement reports. The communications manager 620 may be configured as or otherwise support a means for transmitting a radar waveform according to the indicated configuration. The communications manager 620 may be configured as or otherwise support a means for receiving a reflection of the radar waveform off of at least a first radar target. The communications manager 620 may be configured as or otherwise support a means for determining, based on the received reflection, a first set of values for one or more radar measurement parameters associated with the first radar target. The communications manager 620 may be configured as or otherwise support a means for transmitting, to at least a first UE according to the indicated configuration, a radar measurement report including the first set of values and an indication of a first time value associated with the first set of values.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for improved radar sensing and exchange of radar sensing information. Such improved cooperative radar sensing may result in more efficient use of computational resources, improved accuracy of identification of radar targets, increased confidence levels for location, velocity, orientation, etc., for each detected radar targets, and the ability to identify otherwise undetectable radar targets. Such techniques may further result in increased safety and avoidance of accidents and collisions, increased effectiveness of safety procedures, improved confidence in detection procedures, and improved user experience.

Figure 7:
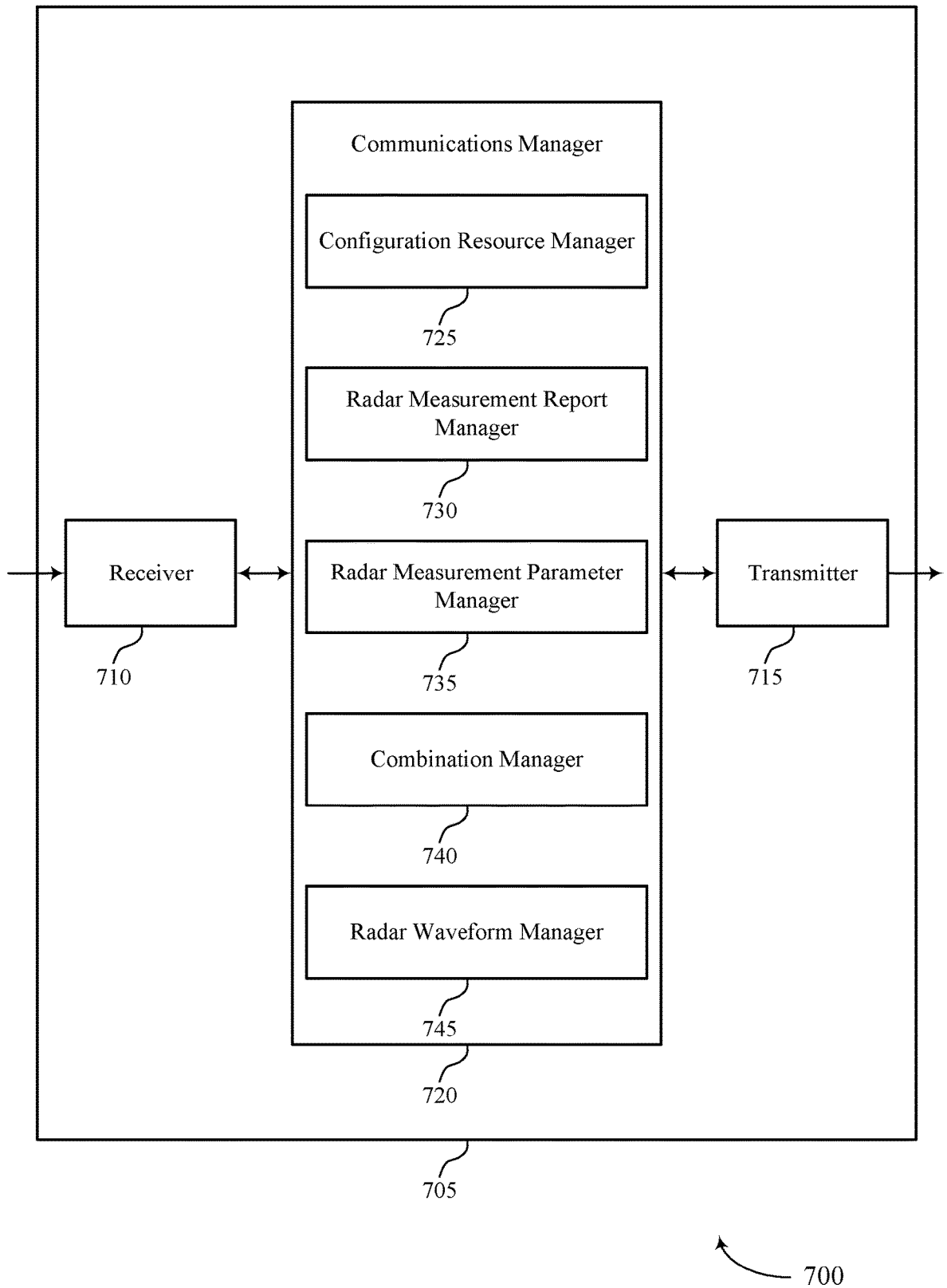

FIG. 7 shows a block diagram 700 of a device 705 that supports cooperative vehicular radar sensing in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to cooperative vehicular radar sensing). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to cooperative vehicular radar sensing). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of cooperative vehicular radar sensing as described herein. For example, the communications manager 720 may include a configuration resource manager 725, a radar measurement report manager 730, a radar measurement parameter manager 735, a combination manager 740, a radar waveform manager 745, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a first UE in accordance with examples as disclosed herein. The configuration resource manager 725 may be configured as or otherwise support a means for receiving an indication of a configuration to perform cooperative radar sensing, the configuration indicating resources for the first UE to use to communicate radar measurement reports. The radar measurement report manager 730 may be configured as or otherwise support a means for receiving, from a second UE according to the indicated configuration, a radar measurement report including a first set of values for one or more radar measurement parameters associated with a first radar target and an indication of a first time value associated with the first set of values. The radar measurement parameter manager 735 may be configured as or otherwise support a means for identifying, by the first UE, a second set of values for the one or more radar measurement parameters associated with the first radar target and the first time value. The combination manager 740 may be configured as or otherwise support a means for generating a combined set of values for the one or more radar measurement parameters associated with the first time value by combining the first set of values and the second set of values.

Additionally, or alternatively, the communications manager 720 may support wireless communications at a second UE in accordance with examples as disclosed herein. The configuration resource manager 725 may be configured as or otherwise support a means for receiving an indication of a configuration to perform cooperative radar sensing, the configuration indicating resources for the second UE to use to communicate radar measurement reports. The radar waveform manager 745 may be configured as or otherwise support a means for transmitting a radar waveform according to the indicated configuration. The radar waveform manager 745 may be configured as or otherwise support a means for receiving a reflection of the radar waveform off of at least a first radar target. The radar measurement parameter manager 735 may be configured as or otherwise support a means for determining, based on the received reflection, a first set of values for one or more radar measurement parameters associated with the first radar target. The radar measurement report manager 730 may be configured as or otherwise support a means for transmitting, to at least a first UE according to the indicated configuration, a radar measurement report including the first set of values and an indication of a first time value associated with the first set of values.

Figure 8:
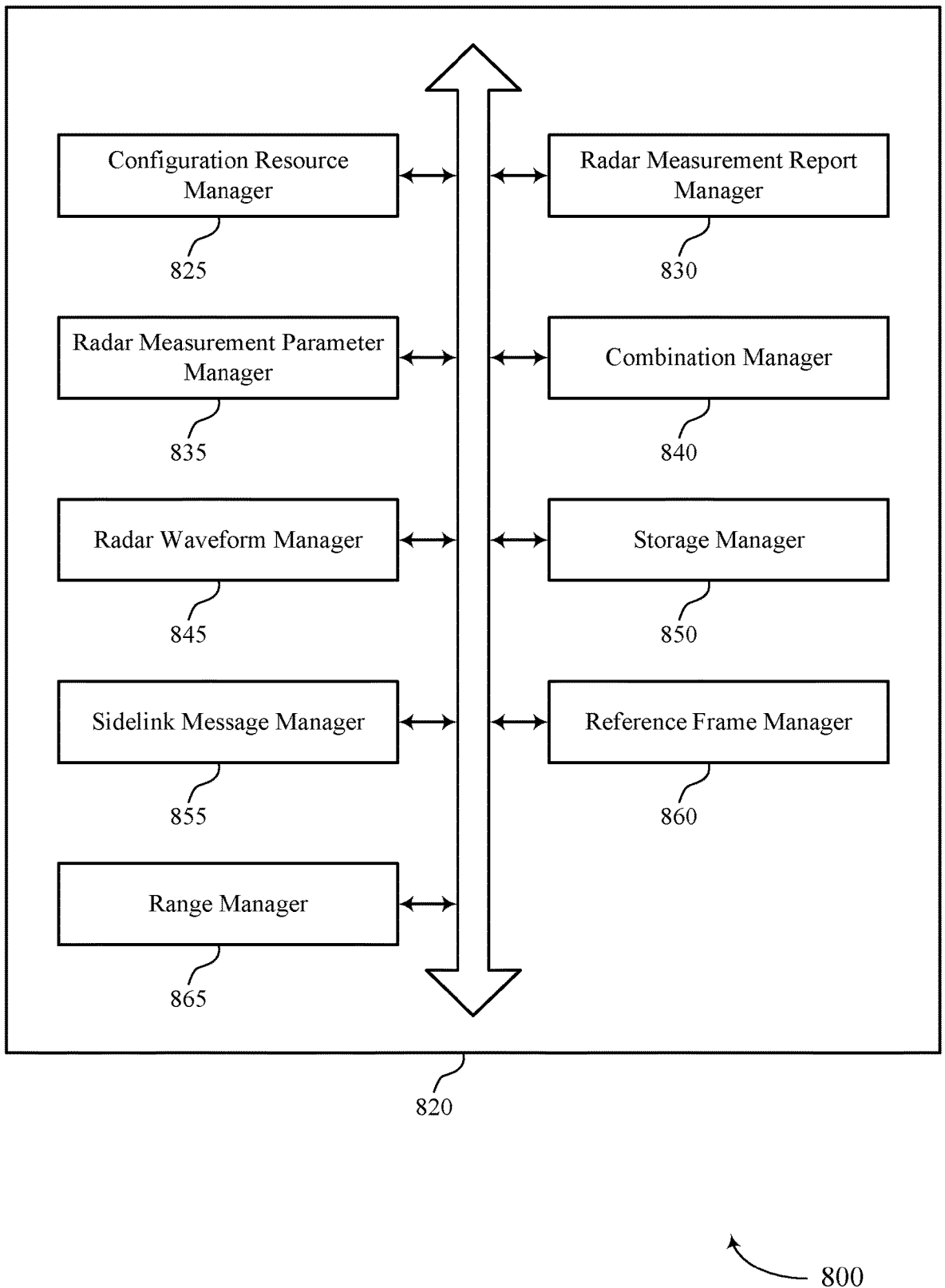
FIG. 8 shows a block diagram of a communications manager that supports cooperative vehicular radar sensing in accordance with aspects of the present disclosure.

FIG. 8 shows a block diagram 800 of a communications manager 820 that supports cooperative vehicular radar sensing in accordance with aspects of the present disclosure. The communications manager 820 may be an example of aspects of a communications manager 620, a communications manager 720, or both, as described herein. The communications manager 820, or various components thereof, may be an example of means for performing various aspects of cooperative vehicular radar sensing as described herein. For example, the communications manager 820 may include a configuration resource manager 825, a radar measurement report manager 830, a radar measurement parameter manager 835, a combination manager 840, a radar waveform manager 845, a storage manager 850, a sidelink message manager 855, a reference frame manager 860, a range manager 865, or any combination thereof. Each of these components may communicate, directly or indirectly, with one another (e.g., via one or more buses).

The communications manager 820 may support wireless communications at a first UE in accordance with examples as disclosed herein. The configuration resource manager 825 may be configured as or otherwise support a means for receiving an indication of a configuration to perform cooperative radar sensing, the configuration indicating resources for the first UE to use to communicate radar measurement reports. The radar measurement report manager 830 may be configured as or otherwise support a means for receiving, from a second UE according to the indicated configuration, a radar measurement report including a first set of values for one or more radar measurement parameters associated with a first radar target and an indication of a first time value associated with the first set of values. The radar measurement parameter manager 835 may be configured as or otherwise support a means for identifying, by the first UE, a second set of values for the one or more radar measurement parameters associated with the first radar target and the first time value. The combination manager 840 may be configured as or otherwise support a means for generating a combined set of values for the one or more radar measurement parameters associated with the first time value by combining the first set of values and the second set of values.

In some examples, to support identifying the second set of values for the one or more radar measurement parameters, the radar waveform manager 845 may be configured as or otherwise support a means for transmitting a radar waveform according to the indicated configuration. In some examples, to support identifying the second set of values for the one or more radar measurement parameters, the radar waveform manager 845 may be configured as or otherwise support a means for receiving a reflection of the radar waveform off of the first radar target. In some examples, to support identifying the second set of values for the one or more radar measurement parameters, the radar measurement parameter manager 835 may be configured as or otherwise support a means for determining, based on the received reflection, the second set of values for the one or more radar measurement parameters associated with the first radar target and the first time value.

In some examples, to support identifying the second set of values for the one or more radar measurement parameters, the radar measurement report manager 830 may be configured as or otherwise support a means for receiving, from a third UE according to the indicated configuration, a second radar measurement report including the second set of values for the one or more radar measurement parameters and an indication of the first time value associated with the second set of values.

In some examples, to support receiving the indication of the configuration to perform cooperative radar sensing, the configuration resource manager 825 may be configured as or otherwise support a means for receiving, from a base station, an allocation of the resources for the first UE to use to communicate radar measurement reports, where the resources include periodic sidelink resources, aperiodic sidelink resources, or both, for receiving the radar measurement report.

In some examples, the configuration resource manager 825 may be configured as or otherwise support a means for determining that a sidelink channel is available for sidelink communications, the sidelink channel including the resources for the first UE to use to communicate radar measurement reports.

In some examples, the radar measurement parameter manager 835 may be configured as or otherwise support a means for receiving, in the radar measurement report, a third set of values for the one or more radar measurement parameters associated with a second radar target and an indication of the first time value associated with the third set of values. In some examples, the storage manager 850 may be configured as or otherwise support a means for storing an indication of the first radar target and the second radar target, based on receiving the third set of values.

In some examples, to support receiving the radar measurement report, the sidelink message manager 855 may be configured as or otherwise support a means for receiving a broadcast sidelink message including the radar measurement report from the second UE.

In some examples, to support receiving the radar measurement report, the sidelink message manager 855 may be configured as or otherwise support a means for receiving a unicast sidelink message including the radar measurement report from the second UE. In some examples, the one or more radar measurement parameters include a velocity measurement, a velocity uncertainty level, a position measurement, a position uncertainty level, an orientation measurement, an orientation uncertainty level, a radar cross-section measurement, a radar cross-section uncertainty level, a signal strength measurement, a signal strength uncertainty level, or any combination thereof. In some examples, the radar measurement report includes an identifier of the second UE.

In some examples, the reference frame manager 860 may be configured as or otherwise support a means for identifying a reference frame that is common to the first UE and the second UE for the one or more radar measurement parameters, where the first set of values for the one or more radar measurement parameters and the second set of values for the one or more radar measurement parameters are based on the reference frame. In some examples, the reference frame manager 860 may be configured as or otherwise support a means for identifying a first reference frame associated with the second UE, the radar measurement report including an indication of the first reference frame. In some examples, the reference frame manager 860 may be configured as or otherwise support a means for identifying the first set of values based on the indication of the first reference frame. In some examples, the reference frame manager 860 may be configured as or otherwise support a means for identifying a second reference frame associated with the second set of values for the one or more radar measurement parameters, where identifying the second set of values is based on the second reference frame.

In some examples, the range manager 865 may be configured as or otherwise support a means for determining that a distance between the first UE and the second UE satisfies a threshold distance value, where determining the configuration to perform cooperative radar sensing is based on determining that the distance satisfies the threshold distance value.

Additionally, or alternatively, the communications manager 820 may support wireless communications at a second UE in accordance with examples as disclosed herein. In some examples, the configuration resource manager 825 may be configured as or otherwise support a means for receiving an indication of a configuration to perform cooperative radar sensing, the configuration indicating resources for the second UE to use to communicate radar measurement reports. The radar waveform manager 845 may be configured as or otherwise support a means for transmitting a radar waveform according to the indicated configuration. In some examples, the radar waveform manager 845 may be configured as or otherwise support a means for receiving a reflection of the radar waveform off of at least a first radar target. In some examples, the radar measurement parameter manager 835 may be configured as or otherwise support a means for determining, based on the received reflection, a first set of values for one or more radar measurement parameters associated with the first radar target. In some examples, the radar measurement report manager 830 may be configured as or otherwise support a means for transmitting, to at least a first UE according to the indicated configuration, a radar measurement report including the first set of values and an indication of a first time value associated with the first set of values.

In some examples, the radar measurement report manager 830 may be configured as or otherwise support a means for receiving, from the first UE according to the indicated configuration, a second radar measurement report including a second set of values for the one or more radar measurement parameters associated with the first radar target and an indication of the first time value associated with the second set of values. In some examples, the combination manager 840 may be configured as or otherwise support a means for generating a combined set of values for the one or more radar measurement parameters associated with the first time value by combining the first set of values and the second set of values.

In some examples, to support receiving the indication of the configuration to perform cooperative radar sensing, the configuration resource manager 825 may be configured as or otherwise support a means for receiving, from a base station, an allocation of the resources for the second UE to use to communicate radar measurement reports, where the resources include periodic sidelink resources, aperiodic sidelink resources, or both, for transmitting the radar measurement report. In some examples, the configuration resource manager 825 may be configured as or otherwise support a means for determining that a sidelink channel is available for sidelink communications, the sidelink channel including the resources for the second UE to receive the radar measurement reports.

In some examples, to support transmitting the radar measurement report, the sidelink message manager 855 may be configured as or otherwise support a means for transmitting, to a set of multiple UEs including the first UE, a broadcast sidelink message including the radar measurement report.

In some examples, to support transmitting the radar measurement report, the sidelink message manager 855 may be configured as or otherwise support a means for transmitting, to the first UE, a unicast sidelink message including the radar measurement report. In some examples, the one or more radar measurement parameters include: a velocity measurement, a velocity uncertainty level, a position measurement, a position uncertainty level, an orientation measurement, an orientation uncertainty level, a radar cross-section measurement, a radar cross-section uncertainty level, a signal strength measurement, a signal strength uncertainty level, or any combination thereof. In some examples, the radar measurement report includes an identifier of the second UE.

In some examples, the reference frame manager 860 may be configured as or otherwise support a means for identifying a reference frame associated with the second UE, where the first set of values for the one or more radar measurement parameters is based on the reference frame associated with the second UE. In some examples, the reference frame manager 860 may be configured as or otherwise support a means for including the reference frame associated with the second UE in the radar measurement report.

In some examples, the range manager 865 may be configured as or otherwise support a means for determining that a distance between the first UE and the second UE satisfies a threshold distance value, where determining the configuration to perform cooperative radar sensing is based on determining that the distance satisfies the threshold distance value.

Figure 9:
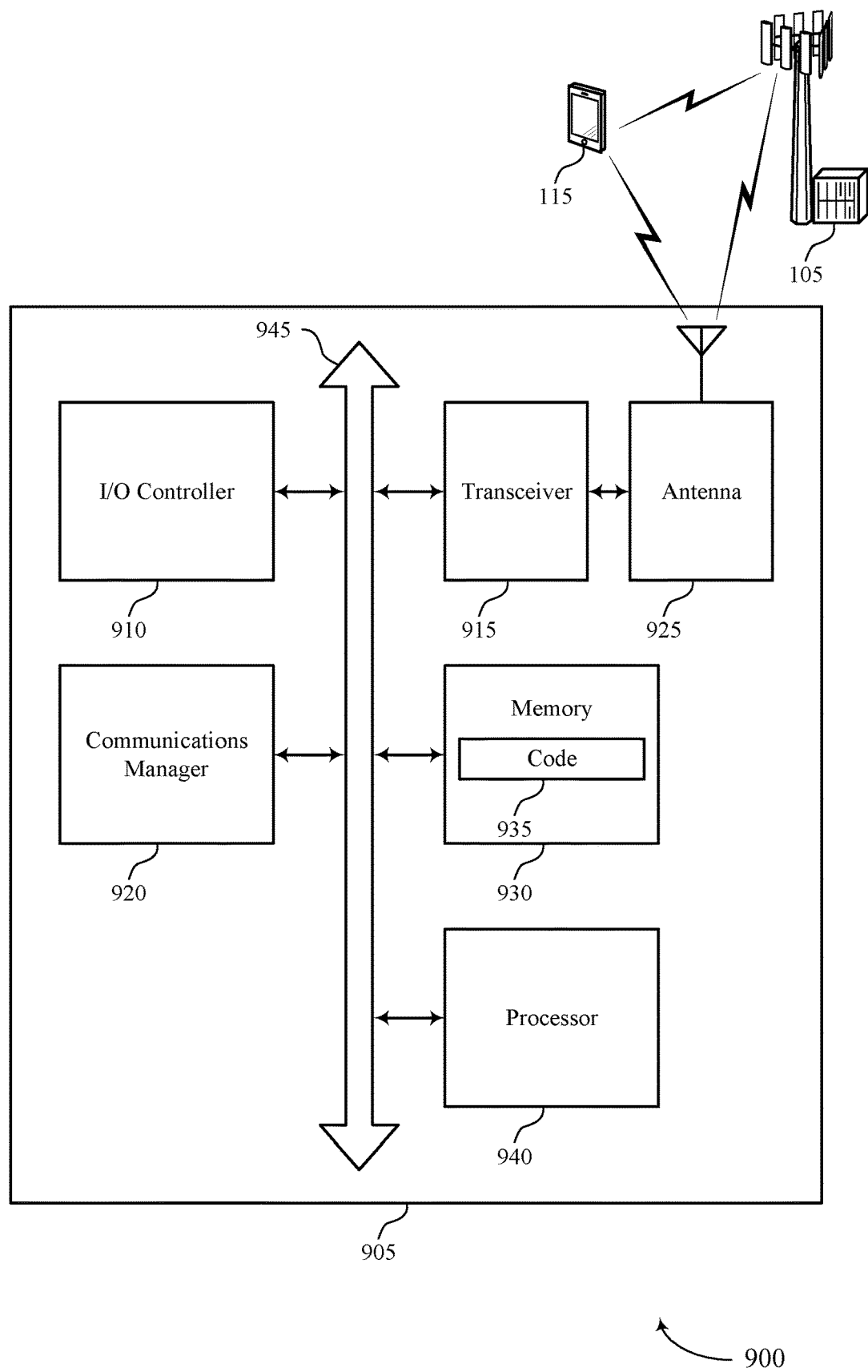
FIG. 9 shows a diagram of a system including a device that supports cooperative vehicular radar sensing in accordance with aspects of the present disclosure.

FIG. 9 shows a diagram of a system 900 including a device 905 that supports cooperative vehicular radar sensing in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting cooperative vehicular radar sensing). For example, the device 905 or a component of the device 905 may include a processor 940 and memory 930 coupled to the processor 940, the processor 940 and memory 930 configured to perform various functions described herein.

The communications manager 920 may support wireless communications at a first UE in accordance with examples as disclosed herein. For example, the communications manager 920 may be configured as or otherwise support a means for receiving an indication of a configuration to perform cooperative radar sensing, the configuration indicating resources for the first UE to use to communicate radar measurement reports. The communications manager 920 may be configured as or otherwise support a means for receiving, from a second UE according to the indicated configuration, a radar measurement report including a first set of values for one or more radar measurement parameters associated with a first radar target and an indication of a first time value associated with the first set of values. The communications manager 920 may be configured as or otherwise support a means for identifying, by the first UE, a second set of values for the one or more radar measurement parameters associated with the first radar target and the first time value. The communications manager 920 may be configured as or otherwise support a means for generating a combined set of values for the one or more radar measurement parameters associated with the first time value by combining the first set of values and the second set of values.

Additionally, or alternatively, the communications manager 920 may support wireless communications at a second UE in accordance with examples as disclosed herein. For example, the communications manager 920 may be configured as or otherwise support a means for receiving an indication of a configuration to perform cooperative radar sensing, the configuration indicating resources for the second UE to use to communicate radar measurement reports. The communications manager 920 may be configured as or otherwise support a means for transmitting a radar waveform according to the indicated configuration. The communications manager 920 may be configured as or otherwise support a means for receiving a reflection of the radar waveform off of at least a first radar target. The communications manager 920 may be configured as or otherwise support a means for determining, based on the received reflection, a first set of values for one or more radar measurement parameters associated with the first radar target. The communications manager 920 may be configured as or otherwise support a means for transmitting, to at least a first UE according to the indicated configuration, a radar measurement report including the first set of values and an indication of a first time value associated with the first set of values.

By including or configuring the communications manager 920 in accordance with examples as described herein, the device 905 may support techniques for improved radar sensing and exchange of radar sensing information. Such improved cooperative radar sensing may result in more efficient use of computational resources, improved accuracy of identification of radar targets, increased confidence levels for location, velocity, orientation, etc., for each detected radar targets, and the ability to identify otherwise undetectable radar targets. Such techniques may further result in increased safety and avoidance of accidents and collisions, increased effectiveness of safety procedures, improved confidence in detection procedures, and improved user experience.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of cooperative vehicular radar sensing as described herein, or the processor 940 and the memory 930 may be otherwise configured to perform or support such operations.

Figure 10:
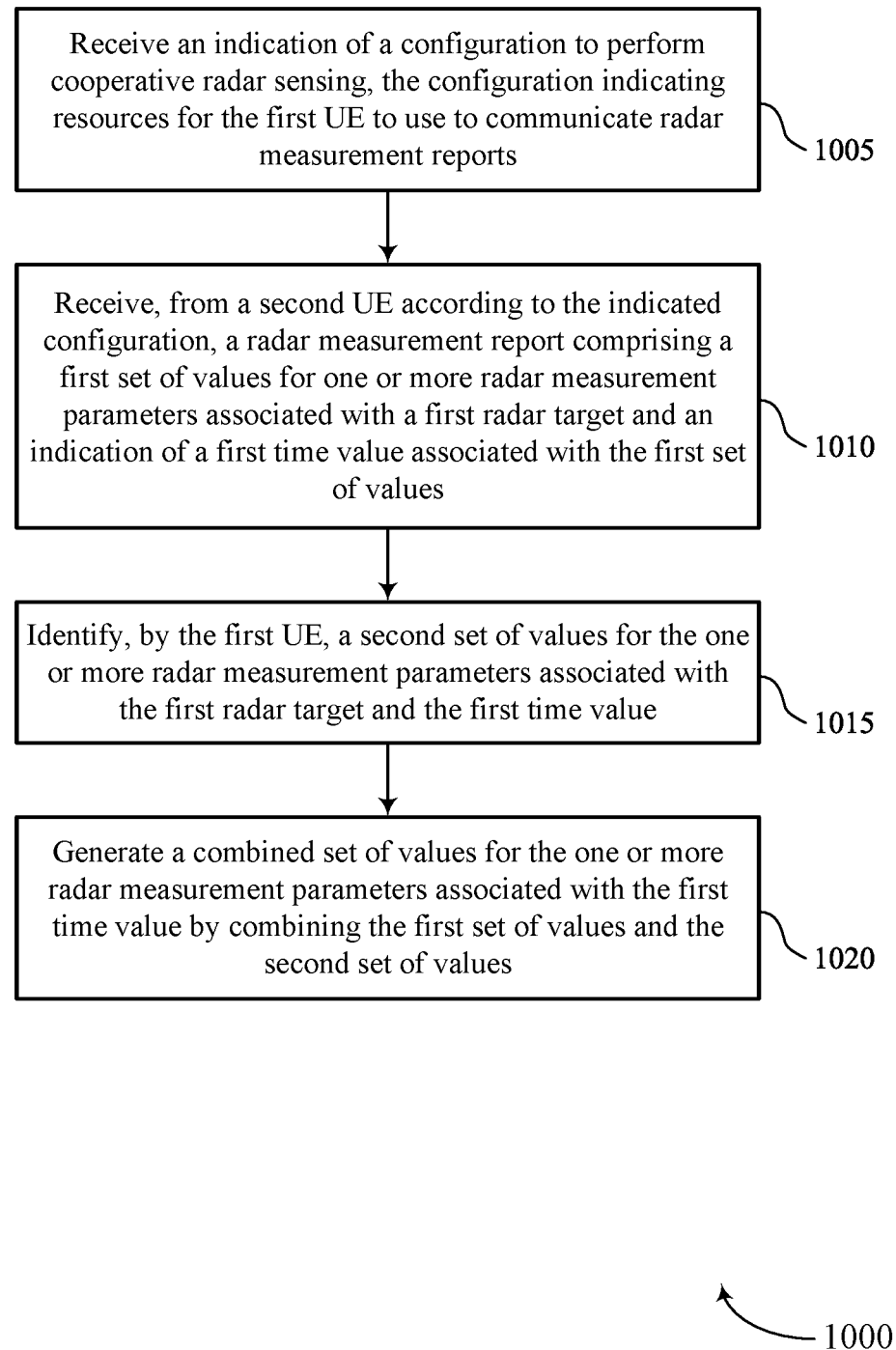
FIGS. 10 through 13 show flowcharts illustrating methods that support cooperative vehicular radar sensing in accordance with aspects of the present disclosure.

FIG. 10 shows a flowchart illustrating a method 1000 that supports cooperative vehicular radar sensing in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1005, the method may include receiving an indication of a configuration to perform cooperative radar sensing, the configuration indicating resources for the first UE to use to communicate radar measurement reports. The operations of 1005 may be performed in accordance with examples as disclosed herein. In some examples, aspects of the operations of 1005 may be performed by a configuration resource manager 825 as described with reference to FIG. 8.

At 1010, the method may include receiving, from a second UE according to the indicated configuration, a radar measurement report including a first set of values for one or more radar measurement parameters associated with a first radar target and an indication of a first time value associated with the first set of values. The operations of 1010 may be performed in accordance with examples as disclosed herein. In some examples, aspects of the operations of 1010 may be performed by a radar measurement report manager 830 as described with reference to FIG. 8.

At 1015, the method may include identifying, by the first UE, a second set of values for the one or more radar measurement parameters associated with the first radar target and the first time value. The operations of 1015 may be performed in accordance with examples as disclosed herein. In some examples, aspects of the operations of 1015 may be performed by a radar measurement parameter manager 835 as described with reference to FIG. 8.

At 1020, the method may include generating a combined set of values for the one or more radar measurement parameters associated with the first time value by combining the first set of values and the second set of values. The operations of 1020 may be performed in accordance with examples as disclosed herein. In some examples, aspects of the operations of 1020 may be performed by a combination manager 840 as described with reference to FIG. 8.

Figure 11:
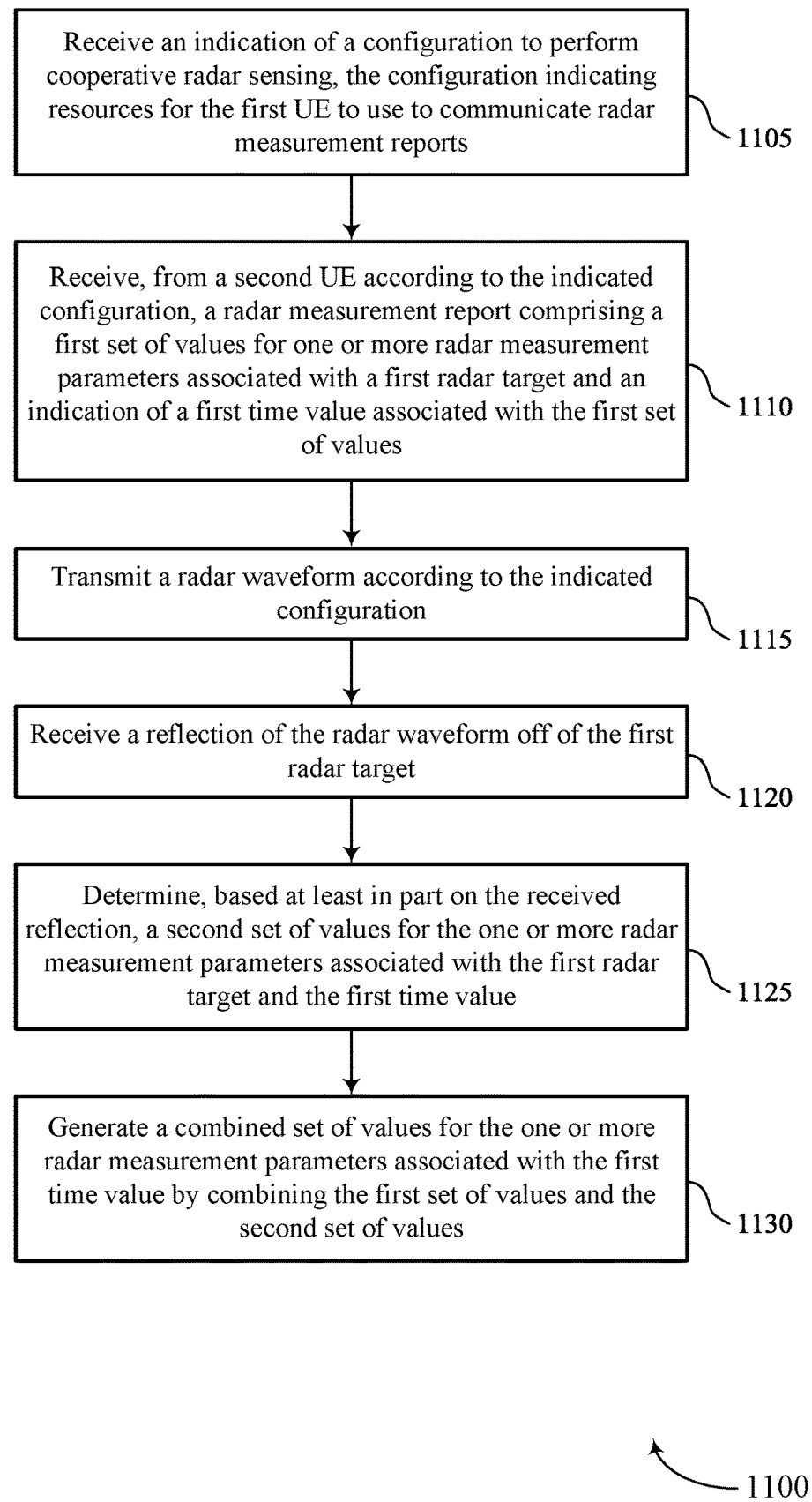

FIG. 11 shows a flowchart illustrating a method 1100 that supports cooperative vehicular radar sensing in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1105, the method may include receiving an indication of a configuration to perform cooperative radar sensing, the configuration indicating resources for the first UE to use to communicate radar measurement reports. The operations of 1105 may be performed in accordance with examples as disclosed herein. In some examples, aspects of the operations of 1105 may be performed by a configuration resource manager 825 as described with reference to FIG. 8.

At 1110, the method may include receiving, from a second UE according to the indicated configuration, a radar measurement report including a first set of values for one or more radar measurement parameters associated with a first radar target and an indication of a first time value associated with the first set of values. The operations of 1110 may be performed in accordance with examples as disclosed herein. In some examples, aspects of the operations of 1110 may be performed by a radar measurement report manager 830 as described with reference to FIG. 8.

At 1115, the method may include transmitting a radar waveform according to the indicated configuration. The operations of 1115 may be performed in accordance with examples as disclosed herein. In some examples, aspects of the operations of 1115 may be performed by a radar waveform manager 845 as described with reference to FIG. 8.

At 1120, the method may include receiving a reflection of the radar waveform off of the first radar target. The operations of 1120 may be performed in accordance with examples as disclosed herein. In some examples, aspects of the operations of 1120 may be performed by a radar waveform manager 845 as described with reference to FIG. 8.

At 1125, the method may include determining, based on the received reflection, the second set of values for the one or more radar measurement parameters associated with the first radar target and the first time value. The operations of 1125 may be performed in accordance with examples as disclosed herein. In some examples, aspects of the operations of 1125 may be performed by a radar measurement parameter manager 835 as described with reference to FIG. 8.

At 1130, the method may include generating a combined set of values for the one or more radar measurement parameters associated with the first time value by combining the first set of values and the second set of values. The operations of 1130 may be performed in accordance with examples as disclosed herein. In some examples, aspects of the operations of 1130 may be performed by a combination manager 840 as described with reference to FIG. 8.

Figure 12:
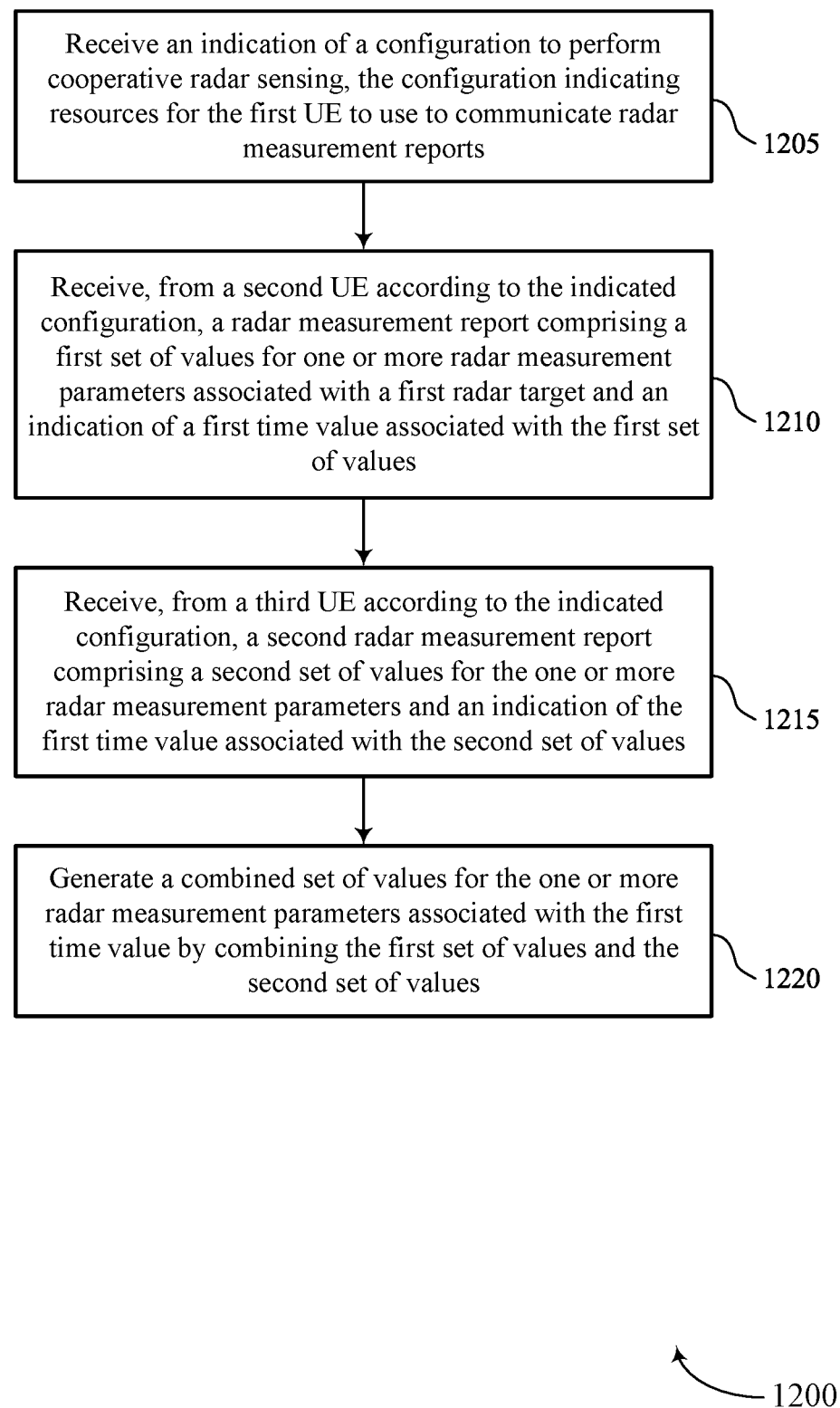

FIG. 12 shows a flowchart illustrating a method 1200 that supports cooperative vehicular radar sensing in accordance with aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1205, the method may include receiving an indication of a configuration to perform cooperative radar sensing, the configuration indicating resources for the first UE to use to communicate radar measurement reports. The operations of 1205 may be performed in accordance with examples as disclosed herein. In some examples, aspects of the operations of 1205 may be performed by a configuration resource manager 825 as described with reference to FIG. 8.

At 1210, the method may include receiving, from a second UE according to the indicated configuration, a radar measurement report including a first set of values for one or more radar measurement parameters associated with a first radar target and an indication of a first time value associated with the first set of values. The operations of 1210 may be performed in accordance with examples as disclosed herein. In some examples, aspects of the operations of 1210 may be performed by a radar measurement report manager 830 as described with reference to FIG. 8.

At 1215, the method may include receiving, from a third UE according to the indicated configuration, a second radar measurement report including a second set of values for the one or more radar measurement parameters and an indication of the first time value associated with the second set of values. The operations of 1215 may be performed in accordance with examples as disclosed herein. In some examples, aspects of the operations of 1215 may be performed by a radar measurement report manager 830 as described with reference to FIG. 8.

At 1220, the method may include generating a combined set of values for the one or more radar measurement parameters associated with the first time value by combining the first set of values and the second set of values. The operations of 1220 may be performed in accordance with examples as disclosed herein. In some examples, aspects of the operations of 1220 may be performed by a combination manager 840 as described with reference to FIG. 8.

Figure 13:
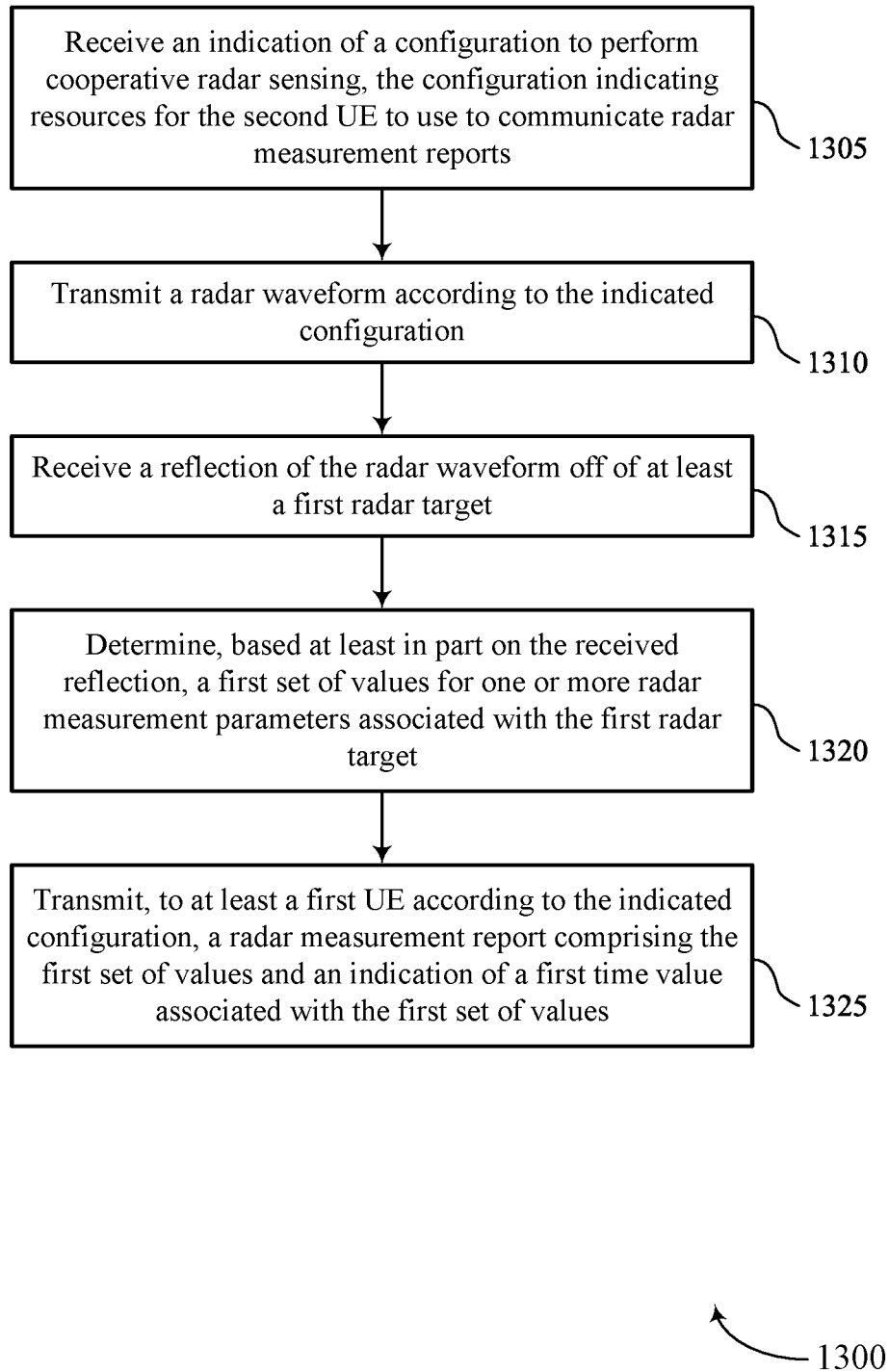

FIG. 13 shows a flowchart illustrating a method 1300 that supports cooperative vehicular radar sensing in accordance with aspects of the present disclosure. The operations of the method 1300 may be implemented by a UE or its components as described herein. For example, the operations of the method 1300 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1305, the method may include receiving an indication of a configuration to perform cooperative radar sensing, the configuration indicating resources for the second UE to use to communicate radar measurement reports. The operations of 1305 may be performed in accordance with examples as disclosed herein. In some examples, aspects of the operations of 1305 may be performed by a configuration resource manager 825 as described with reference to FIG. 8.

At 1310, the method may include transmitting a radar waveform according to the indicated configuration. The operations of 1310 may be performed in accordance with examples as disclosed herein. In some examples, aspects of the operations of 1310 may be performed by a radar waveform manager 845 as described with reference to FIG. 8.

At 1315, the method may include receiving a reflection of the radar waveform off of at least a first radar target. The operations of 1315 may be performed in accordance with examples as disclosed herein. In some examples, aspects of the operations of 1315 may be performed by a radar waveform manager 845 as described with reference to FIG. 8.

At 1320, the method may include determining, based on the received reflection, a first set of values for one or more radar measurement parameters associated with the first radar target. The operations of 1320 may be performed in accordance with examples as disclosed herein. In some examples, aspects of the operations of 1320 may be performed by a radar measurement parameter manager 835 as described with reference to FIG. 8.

At 1325, the method may include transmitting, to at least a first UE according to the indicated configuration, a radar measurement report including the first set of values and an indication of a first time value associated with the first set of values. The operations of 1325 may be performed in accordance with examples as disclosed herein. In some examples, aspects of the operations of 1325 may be performed by a radar measurement report manager 830 as described with reference to FIG. 8.

The following provides an overview of aspects of the present disclosure:

Aspect 1: A method for wireless communications at a first UE, comprising: receiving an indication of a configuration to perform cooperative radar sensing, the configuration indicating resources for the first UE to use to communicate radar measurement reports; receiving, from a second UE according to the indicated configuration, a radar measurement report comprising a first set of values for one or more radar measurement parameters associated with a first radar target and an indication of a first time value associated with the first set of values; identifying, by the first UE, a second set of values for the one or more radar measurement parameters associated with the first radar target and the first time value; and generating a combined set of values for the one or more radar measurement parameters associated with the first time value by combining the first set of values and the second set of values.

Aspect 2: The method of aspect 1, wherein identifying the second set of values for the one or more radar measurement parameters comprises: transmitting a radar waveform according to the indicated configuration; receiving a reflection of the radar waveform off of the first radar target; and determining, based at least in part on the received reflection, the second set of values for the one or more radar measurement parameters associated with the first radar target and the first time value.

Aspect 3: The method of any of aspects 1 through 2, wherein identifying the second set of values for the one or more radar measurement parameters comprises: receiving, from a third UE according to the indicated configuration, a second radar measurement report comprising the second set of values for the one or more radar measurement parameters and an indication of the first time value associated with the second set of values.

Aspect 4: The method of any of aspects 1 through 3, wherein receiving the indication of the configuration to perform cooperative radar sensing comprises: receiving, from a base station, an allocation of the resources for the first UE to use to communicate radar measurement reports, wherein the resources comprise periodic sidelink resources, aperiodic sidelink resources, or both, for receiving the radar measurement report.

Aspect 5: The method of any of aspects 1 through 4, further comprising: determining that a sidelink channel is available for sidelink communications, the sidelink channel comprising the resources for the first UE to use to communicate radar measurement reports.

Aspect 6: The method of any of aspects 1 through 5, further comprising: receiving, in the radar measurement report, a third set of values for the one or more radar measurement parameters associated with a second radar target and an indication of the first time value associated with the third set of values; and storing an indication of the first radar target and the second radar target, based at least in part on receiving the third set of values.

Aspect 7: The method of any of aspects 1 through 6, wherein receiving the radar measurement report comprises: receiving a broadcast sidelink message comprising the radar measurement report from the second UE.

Aspect 8: The method of any of aspects 1 through 7, wherein receiving the radar measurement report comprises: receiving a unicast sidelink message comprising the radar measurement report from the second UE.

Aspect 9: The method of any of aspects 1 through 8, wherein the one or more radar measurement parameters comprise a velocity measurement, a velocity uncertainty level, a position measurement, a position uncertainty level, an orientation measurement, an orientation uncertainty level, a radar cross-section measurement, a radar cross-section uncertainty level, a signal strength measurement, a signal strength uncertainty level, or any combination thereof.

Aspect 10: The method of any of aspects 1 through 9, wherein the radar measurement report comprises an identifier of the second UE.

Aspect 11: The method of any of aspects 1 through 10, further comprising: identifying a reference frame that is common to the first UE and the second UE for the one or more radar measurement parameters, wherein the first set of values for the one or more radar measurement parameters and the second set of values for the one or more radar measurement parameters are based at least in part on the reference frame.

Aspect 12: The method of any of aspects 1 through 11, further comprising: identifying a first reference frame associated with the second UE, the radar measurement report comprising an indication of the first reference frame; identifying the first set of values based at least in part on the indication of the first reference frame; and identifying a second reference frame associated with the second set of values for the one or more radar measurement parameters, wherein identifying the second set of values is based at least in part on the second reference frame.

Aspect 13: The method of any of aspects 1 through 12, further comprising: determining that a distance between the first UE and the second UE satisfies a threshold distance value, wherein determining the configuration to perform cooperative radar sensing is based at least in part on determining that the distance satisfies the threshold distance value.

Aspect 14: A method for wireless communications at a second UE, comprising: receiving an indication of a configuration to perform cooperative radar sensing, the configuration indicating resources for the second UE to use to communicate radar measurement reports; transmitting a radar waveform according to the indicated configuration; receiving a reflection of the radar waveform off of at least a first radar target; determining, based at least in part on the received reflection, a first set of values for one or more radar measurement parameters associated with the first radar target; and transmitting, to at least a first UE according to the indicated configuration, a radar measurement report comprising the first set of values and an indication of a first time value associated with the first set of values.

Aspect 15: The method of aspect 14, further comprising: receiving, from the first UE according to the indicated configuration, a second radar measurement report comprising a second set of values for the one or more radar measurement parameters associated with the first radar target and an indication of the first time value associated with the second set of values; and generating a combined set of values for the one or more radar measurement parameters associated with the first time value by combining the first set of values and the second set of values.

Aspect 16: The method of any of aspects 14 through 15, wherein receiving the indication of the configuration to perform cooperative radar sensing comprises: receiving, from a base station, an allocation of the resources for the second UE to use to communicate radar measurement reports, wherein the resources comprise periodic sidelink resources, aperiodic sidelink resources, or both, for transmitting the radar measurement report.

Aspect 17: The method of any of aspects 14 through 16, further comprising: determining that a sidelink channel is available for sidelink communications, the sidelink channel comprising the resources for the second UE to receive the radar measurement reports.

Aspect 18: The method of any of aspects 14 through 17, wherein transmitting the radar measurement report comprises: transmitting, to a plurality of UEs comprising the first UE, a broadcast sidelink message comprising the radar measurement report.

Aspect 19: The method of any of aspects 14 through 18, wherein transmitting the radar measurement report comprises: transmitting, to the first UE, a unicast sidelink message comprising the radar measurement report.

Aspect 20: The method of any of aspects 14 through 19, wherein the one or more radar measurement parameters comprise a velocity measurement, a velocity uncertainty level, a position measurement, a position uncertainty level, an orientation measurement, an orientation uncertainty level, a radar cross-section measurement, a radar cross-section uncertainty level, a signal strength measurement, a signal strength uncertainty level, or any combination thereof.

Aspect 21: The method of any of aspects 14 through 20, wherein the radar measurement report comprises an identifier of the second UE.

Aspect 22: The method of any of aspects 14 through 21, further comprising: identifying a reference frame associated with the second UE, wherein the first set of values for the one or more radar measurement parameters is based at least in part on the reference frame associated with the second UE; and including the reference frame associated with the second UE in the radar measurement report.

Aspect 23: The method of any of aspects 14 through 22, further comprising: determining that a distance between the first UE and the second UE satisfies a threshold distance value, wherein determining the configuration to perform cooperative radar sensing is based at least in part on determining that the distance satisfies the threshold distance value.

Aspect 24: An apparatus for wireless communications at a first UE, comprising a processor; memory coupled with the processor; and instructions stored in the memory and executable by the processor to cause the apparatus to perform a method of any of aspects 1 through 13.

Aspect 25: An apparatus for wireless communications at a first UE, comprising at least one means for performing a method of any of aspects 1 through 13.

Aspect 26: A non-transitory computer-readable medium storing code for wireless communications at a first UE, the code comprising instructions executable by a processor to perform a method of any of aspects 1 through 13.

Aspect 27: An apparatus for wireless communications at a second UE, comprising a processor; memory coupled with the processor; and instructions stored in the memory and executable by the processor to cause the apparatus to perform a method of any of aspects 14 through 23.

Aspect 28: An apparatus for wireless communications at a second UE, comprising at least one means for performing a method of any of aspects 14 through 23.

Aspect 29: A non-transitory computer-readable medium storing code for wireless communications at a second UE, the code comprising instructions executable by a processor to perform a method of any of aspects 14 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first user equipment (UE), comprising:
receiving an indication of a configuration to perform cooperative radar sensing, the configuration indicating resources for the first UE to use to communicate radar measurement reports;
receiving, from a second UE via the indicated resources and according to the indicated configuration, a radar measurement report comprising a first set of values for one or more radar measurement parameters associated with a first radar target and an indication of a first time value associated with the first set of values, wherein the first set of values correspond to a first set of uncertainty levels;
identifying, by the first UE, a second set of values for the one or more radar measurement parameters associated with the first radar target and the first time value, wherein the second set of values correspond to a second set of uncertainty levels; and
generating a combined set of values for the one or more radar measurement parameters associated with the first time value by combining the first set of values and the second set of values, wherein the combined set of values corresponds to a third set of uncertainty levels based at least in part on the first set of uncertainty levels and the second set of uncertainty levels.

2. The method of claim 1, wherein identifying the second set of values for the one or more radar measurement parameters comprises:
transmitting a radar waveform according to the indicated configuration;
receiving a reflection of the radar waveform off of the first radar target; and
determining, based at least in part on the received reflection, the second set of values for the one or more radar measurement parameters associated with the first radar target and the first time value.

3. The method of claim 1, wherein identifying the second set of values for the one or more radar measurement parameters comprises:
receiving, from a third UE according to the indicated configuration, a second radar measurement report comprising the second set of values for the one or more radar measurement parameters and an indication of the first time value associated with the second set of values.

4. The method of claim 1, wherein receiving the indication of the configuration to perform cooperative radar sensing comprises:
receiving, from a base station, an allocation of the resources for the first UE to use to communicate radar measurement reports, wherein the resources comprise periodic sidelink resources, aperiodic sidelink resources, or both, for receiving the radar measurement report.

5. The method of claim 1, further comprising:
determining that a sidelink channel is available for sidelink communications, the sidelink channel comprising the resources for the first UE to use to communicate radar measurement reports.

6. The method of claim 1, further comprising:
receiving, in the radar measurement report, a third set of values for the one or more radar measurement parameters associated with a second radar target and an indication of the first time value associated with the third set of values; and
storing an indication of the first radar target and the second radar target, based at least in part on receiving the third set of values.

7. The method of claim 1, wherein receiving the radar measurement report comprises:
receiving a broadcast sidelink message comprising the radar measurement report from the second UE.

8. The method of claim 1, wherein receiving the radar measurement report comprises:
receiving a unicast sidelink message comprising the radar measurement report from the second UE.

9. The method of claim 1, wherein the one more radar measurement parameters comprise a velocity measurement, a position measurement, an orientation measurement, a radar cross-section measurement, a signal strength measurement, or any combination thereof, and wherein the uncertainty levels comprise a velocity uncertainty level, a position uncertainty level, an orientation uncertainty level, a radar cross-section uncertainty level, a signal strength uncertainty level, or any combination thereof.

10. The method of claim 1, wherein the radar measurement report comprises an identifier of the second UE.

11. The method of claim 1, further comprising:
identifying a reference frame that is common to the first UE and the second UE for the one or more radar measurement parameters, wherein the first set of values for the one or more radar measurement parameters and the second set of values for the one or more radar measurement parameters are based at least in part on the reference frame.

12. The method of claim 1, further comprising:
identifying a first reference frame associated with the second UE, the radar measurement report comprising an indication of the first reference frame;
identifying the first set of values based at least in part on the indication of the first reference frame; and
identifying a second reference frame associated with the second set of values for the one or more radar measurement parameters, wherein identifying the second set of values is based at least in part on the second reference frame.

13. The method of claim 1, further comprising:
determining that a distance between the first UE and the second UE satisfies a threshold distance value, wherein determining the configuration to perform cooperative radar sensing is based at least in part on determining that the distance satisfies the threshold distance value.

14. A method for wireless communications at a second user equipment (UE), comprising:
receiving an indication of a configuration to perform cooperative radar sensing, the configuration indicating resources for the second UE to use to communicate radar measurement reports;
transmitting a radar waveform according to the indicated configuration;
receiving a reflection of the radar waveform off of at least a first radar target;
determining, based at least in part on the received reflection, a first set of values corresponding to a first set of uncertainty values for one or more radar measurement parameters associated with the first radar target; and transmitting, to at least a first UE via the indicated resources and according to the indicated configuration, a radar measurement report comprising the first set of values, the first set of uncertainty values, and an indication of a first time value associated with the first set of values, wherein a first uncertainty value of the first set of uncertainty values corresponds to a first value of the first set of values.

15. The method of claim 14, further comprising:
receiving, from the first UE according to the indicated configuration, a second radar measurement report comprising a second set of values for the one or more radar measurement parameters associated with the first radar target and an indication of the first time value associated with the second set of values; and
generating a combined set of values for the one or more radar measurement parameters associated with the first time value by combining the first set of values and the second set of values.

16. The method of claim 14, wherein receiving the indication of the configuration to perform cooperative radar sensing comprises:
receiving, from a base station, an allocation of the resources for the second UE to use to communicate radar measurement reports, wherein the resources comprise periodic sidelink resources, aperiodic sidelink resources, or both, for transmitting the radar measurement report.

17. The method of claim 14, further comprising:
determining that a sidelink channel is available for sidelink communications, the sidelink channel comprising the resources for the second UE to receive the radar measurement reports.

18. The method of claim 14, wherein transmitting the radar measurement report comprises:
transmitting, to a plurality of UEs comprising the first UE, a broadcast sidelink message comprising the radar measurement report.

19. The method of claim 14, wherein transmitting the radar measurement report comprises:
transmitting, to the first UE, a unicast sidelink message comprising the radar measurement report.

20. The method of claim 14, wherein the one or more radar measurement parameters comprise a velocity measurement, a position measurement, an orientation measurement, a radar cross-section measurement, a signal strength measurement, or any combination thereof, and wherein the first set of uncertainty values comprise a velocity uncertainty value, a position uncertainty value, an orientation uncertainty value, a radar cross-section uncertainty value, a signal strength uncertainty value, or any combination thereof.

21. The method of claim 14, wherein the radar measurement report comprises an identifier of the second UE.

22. The method of claim 14, further comprising:
identifying a reference frame associated with the second UE, wherein the first set of values for the one or more radar measurement parameters is based at least in part on the reference frame associated with the second UE; and
including the reference frame associated with the second UE in the radar measurement report.

23. The method of claim 14, further comprising:
determining that a distance between the first UE and the second UE satisfies a threshold distance value, wherein determining the configuration to perform cooperative radar sensing is based at least in part on determining that the distance satisfies the threshold distance value.

24. An apparatus for wireless communications at a first user equipment (UE), comprising:
one or more processors;
one or more memories coupled with the one or more processors; and
one or more processor-readable instructions stored in the one or more memories and executable by the one or more processors to cause the apparatus to:
receive an indication of a configuration to perform cooperative radar sensing, the configuration indicating resources for the first UE to use to communicate radar measurement reports;
receive, from a second UE via the indicated resources and according to the indicated configuration, a radar measurement report comprising a first set of values for one or more radar measurement parameters associated with a first radar target and an indication of a first time value associated with the first set of values, wherein the first set of values correspond to a first set of uncertainty levels;
identify, by the first UE, a second set of values for the one or more radar measurement parameters associated with the first radar target and the first time value, wherein the second set of values correspond to a second set of uncertainty levels; and
generate a combined set of values for the one or more radar measurement parameters associated with the first time value by combining the first set of values and the second set of values, wherein the combined set of values corresponds to a third set of uncertainty levels based at least in part on the first set of uncertainty levels and the second set of uncertainty levels.

25. The apparatus of claim 24, wherein the instructions to identify the second set of values for the one or more radar measurement parameters are executable by the one or more processors to cause the apparatus to:
transmit a radar waveform according to the indicated configuration;
receive a reflection of the radar waveform off of the first radar target; and
determine, based at least in part on the received reflection, the second set of values for the one or more radar measurement parameters associated with the first radar target and the first time value.

26. The apparatus of claim 24, wherein the instructions to identify the second set of values for the one or more radar measurement parameters are executable by the one or more processors to cause the apparatus to:
receive, from a third UE according to the indicated configuration, a second radar measurement report comprising the second set of values for the one or more radar measurement parameters and an indication of the first time value associated with the second set of values.

27. The apparatus of claim 24, wherein the instructions to receive the indication of the configuration to perform cooperative radar sensing are executable by the one or more processors to cause the apparatus to:
receive, from a base station, an allocation of the resources for the first UE to use to communicate radar measurement reports, wherein the resources comprise periodic sidelink resources, aperiodic sidelink resources, or both, for receiving the radar measurement report.

28. An apparatus for wireless communications at a second user equipment (UE), comprising:
one or more processors;
one or more memories coupled with the one or more processors; and
one or more processor-readable instructions stored in the one or more memories and executable by the one or more processors to cause the apparatus to:
receive an indication of a configuration to perform cooperative radar sensing, the configuration indicating resources for the second UE to use to communicate radar measurement reports;
transmit a radar waveform according to the indicated configuration;
receive a reflection of the radar waveform off of at least a first radar target;
determine, based at least in part on the received reflection, a first set of values corresponding to a first set of uncertainty values for one or more radar measurement parameters associated with the first radar target; and
transmit, to at least a first UE via the indicated resources and according to the indicated configuration, a radar measurement report comprising the first set of values, the first set of uncertainty values, and an indication of a first time value associated with the first set of values wherein a first uncertainty value of the first set of uncertainty values corresponds to a first value of the first set of values.

29. The apparatus of claim 28, wherein the instructions are further executable by the one or more processors to cause the apparatus to:
receive, from the first UE according to the indicated configuration, a second radar measurement report comprising a second set of values for the one or more radar measurement parameters associated with the first radar target and an indication of the first time value associated with the second set of values; and
generate a combined set of values for the one or more radar measurement parameters associated with the first time value by combining the first set of values and the second set of values.

30. The apparatus of claim 28, wherein the instructions to receive the indication of the configuration to perform cooperative radar sensing are executable by the one or more processors to cause the apparatus to:
receive, from a base station, an allocation of the resources for the second UE to use to communicate radar measurement reports, wherein the resources comprise periodic sidelink resources, aperiodic sidelink resources, or both, for transmitting the radar measurement report.

* * * * *